United States Patent
Vujcic et al.

(10) Patent No.: US 8,559,362 B2
(45) Date of Patent: Oct. 15, 2013

(54) RANDOM ACCESS CHANNEL HOPPING FOR FREQUENCY DIVISION MULTIPLEXING ACCESS SYSTEMS

(75) Inventors: Dragan Vujcic, Limours (FR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 12/092,560

(22) PCT Filed: Nov. 3, 2006

(86) PCT No.: PCT/KR2006/004562

§ 371 (c)(1),
(2), (4) Date: May 2, 2008

(87) PCT Pub. No.: WO2007/052972

PCT Pub. Date: May 10, 2007

(65) Prior Publication Data

US 2008/0267126 A1 Oct. 30, 2008

Related U.S. Application Data

(60) Provisional application No. 60/733,733, filed on Nov. 4, 2005, provisional application No. 60/783,700, filed on Mar. 16, 2006, provisional application No. 60/784,680, filed on Mar. 21, 2006.

(51) Int. Cl.
*H04B 7/204* (2006.01)

(52) U.S. Cl.
USPC .......................... 370/319; 370/344; 455/439

(58) Field of Classification Search
None
See application file for complete search history.

(56) References Cited

U.S. PATENT DOCUMENTS

| | | | |
|---|---|---|---|
| 6,574,212 B1 | 6/2003 | Jurgensen et al. | |
| 6,628,946 B1 | 9/2003 | Wiberg et al. | |
| 6,643,318 B1 | 11/2003 | Parsa et al. | |
| 6,694,148 B1 | 2/2004 | Frodigh et al. | |
| 6,975,684 B1 * | 12/2005 | Dabak et al. | 375/260 |
| 7,236,787 B1 | 6/2007 | Tamura et al. | |

(Continued)

FOREIGN PATENT DOCUMENTS

| | | |
|---|---|---|
| CN | 1329802 | 1/2002 |
| KR | 10-2001-0099654 | 11/2001 |
| KR | 2005-0057926 | 6/2005 |
| WO | 2004089013 | 10/2004 |

OTHER PUBLICATIONS

LG Electronics Inc., "UE state transition in LTE_ACTIVE," R2-061002, 3GPP TSG-RAN WG2 #52, Mar. 2006.

(Continued)

*Primary Examiner* — Andrew Lai
*Assistant Examiner* — Leon Andrews
(74) *Attorney, Agent, or Firm* — Lee, Hong, Degerman, Kang & Waimey

(57) ABSTRACT

A method of coordinating resources for repetition of random access bursts performed by a mobile terminal, the method comprising: determining groups of access slots based on parameters from a network, wherein each access slot is defined by any combination of frequency, time and code, and the access slots are organized according to a frequency pattern; transmitting an access burst on an access slot from a chosen group of access slots; and re-transmitting the access burst on the next access slot from the chosen group of access slots.

17 Claims, 18 Drawing Sheets

(56) References Cited

U.S. PATENT DOCUMENTS

| | | |
|---|---|---|
| 2002/0065091 A1 | 5/2002 | Choi |
| 2002/0128035 A1 | 9/2002 | Jokinen et al. |
| 2003/0095528 A1* | 5/2003 | Halton et al. ............... 370/342 |
| 2003/0186705 A1 | 10/2003 | Lahav et al. |
| 2004/0008658 A1 | 1/2004 | Dahlman |
| 2004/0028014 A1 | 2/2004 | Goldberg et al. |
| 2004/0116143 A1 | 6/2004 | Love et al. |
| 2004/0148352 A1 | 7/2004 | Menon et al. |
| 2004/0152473 A1 | 8/2004 | Kuwano et al. |
| 2005/0111480 A1* | 5/2005 | Martin ....................... 370/461 |
| 2005/0177623 A1 | 8/2005 | Roberts et al. |
| 2005/0249141 A1 | 11/2005 | Lee et al. |
| 2006/0166693 A1 | 7/2006 | Jeong et al. |
| 2006/0205413 A1 | 9/2006 | Teague |
| 2006/0274641 A1* | 12/2006 | Grieco et al. ............... 370/210 |
| 2007/0015500 A1* | 1/2007 | Parmar et al. ............ 455/422.1 |
| 2007/0015512 A1* | 1/2007 | Hunzinger ................... 455/439 |
| 2007/0177553 A1 | 8/2007 | Frederiksen et al. |
| 2010/0054308 A1* | 3/2010 | Brisebois et al. ............ 375/133 |

OTHER PUBLICATIONS

Mitsubishi Electric Telecom Europe, "Draft LS about Correction of the PRACH ramp up procedure for collision with FACH measurement occasion avoidance", R1-02/0837, TSG-RAN Working Group 1 meeting #26, May 2002, XP-050096406.

Ericsson, "Broadcast of E-UTRA System Information", R1-060091, TSG-RAN WG1 LTE AdHoc, Jan. 2006.

Huawei; "Transport channel structure for LTE", R2-060024, 3Gpp TSG RAN2 #50, Jan. 2006, XP50130298A.

European Patent Office Application Serial No. 07745597.0, Search Report dated Nov. 6, 2012, 8 pages.

U.S. Appl. No. 12/293,805, Final Office Action dated Jan. 23, 2013, 15 pages.

* cited by examiner

FIG. 6
PRIOR ART

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | 0 | 1 | 2 | 3 | 4 | 5 | |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

FIG. 7
PRIOR ART

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

FIG. 8
PRIOR ART
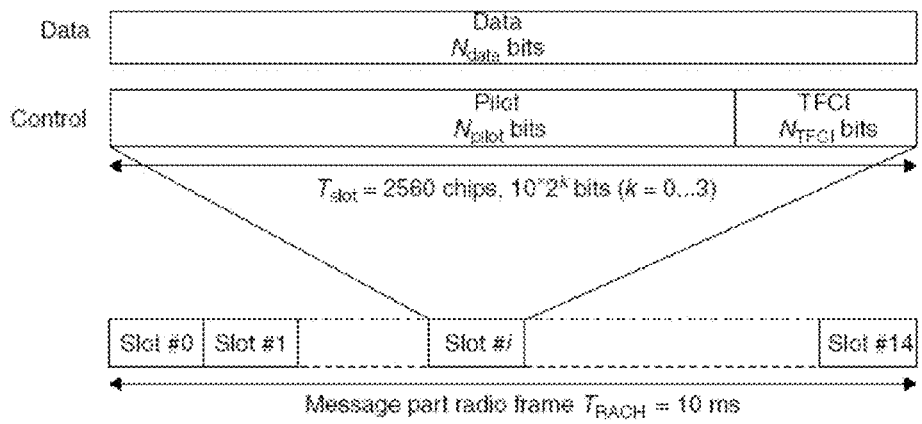
FIG. 9
PRIOR ART
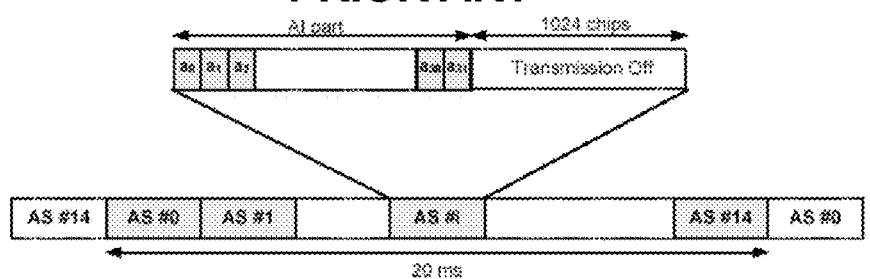
Figure 84: Structure of the AICH
FIG. 10
PRIOR ART
| AC  | 0 - 9  | 10     | 11     | 12     | 13     | 14     | 15     |
|-----|--------|--------|--------|--------|--------|--------|--------|
| ASC | 1st IE | 2nd IE | 3rd IE | 4th IE | 5th IE | 6th IE | 7th IE |

RANDOM ACCESS CHANNEL HOPPING FOR FREQUENCY DIVISION MULTIPLEXING ACCESS SYSTEMS

CROSS-REFERENCE TO RELATED APPLICATIONS

This application is a National Stage filing under 35 U.S.C. 371 of International Application No. PCT/KR2006/004562, filed on Nov. 3, 2006, which claims the benefit of U.S. provisional application Nos. 60/733,733, filed on Nov. 4, 2005, 60/783,700, filed on Mar. 16, 2006, and 60/784,680, filed on Mar. 21, 2006.

TECHNICAL FIELD

The present invention relates to radio communications, and in particular, relates to random access channel hopping for frequency division multiplexing access systems.

BACKGROUND ART

A radio (wireless) communication system may be comprised of an access network and a plurality of access terminals. The access network may include access points, such as Node Bs, base stations, or the like, that allow the access terminals to connect with the access network for uplink (UL: terminal-to-network) communications and downlink (DL: network-to-terminal) communications via various types of channels. The access terminals may be user equipment (UE), mobile stations, or the like.

Although the concepts described hereafter may be applicable to different types of communication systems, the Universal Mobile Telecommunications System (UMTS) will be described merely for exemplary purposes. A typical UMTS has at least one core network (CN) connected with at least one UTRAN (UMTS Terrestrial Radio Access Network) that has Node Bs acting as access points for multiple UEs.

FIG. 1 shows the radio interface protocol architecture according to the 3GPP radio access network standards. The radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 1 can be divided into a first layer (L1), a second layer (L2), and a third layer (L3) based on the three lower layers of an open system inter-connection (OSI) standard model. The first layer (L1), namely, the physical layer (PHY), provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted.

The MAC layer is connected to the physical layer by transport channels and can be divided into a MAC-b sub-layer, a MAC-d sub-layer, a MAC-c/sh sub-layer, a MAC-hs sub-layer and a MAC-m sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink, the Random Access Channel (RACH). The MAC-m sub-layer may handle the MBMS data. The MAC-d sub-layer manages a dedicated channel (DCH), which is a dedicated transport channel for a specific terminal. The MAC-d sub-layer is located in a serving RNC (SRNC) that manages a corresponding terminal and one MAC-d sub-layer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

The E-UTRA (Evolved UMTS Terrestrial Radio Access) system, also called a LTE (Long Term Evolution) system, is considered as involving the PS (Packet Switched) domain with only shared resources to be used. In this new context with faster delay and higher capacity requirements, the usage of LTE RACH (LTE Random Access Channel) should be somewhat different to the existing GSM and UMTS systems in order to meet access requirement specified for LTE. E-UTRA and LTE are related to the principles of Orthogonal Frequency Division Multiplexing (OFDM).

OFDM is based on the well-known technique of Frequency Division Multiplexing (FDM). In FDM, different streams of information are mapped onto separate parallel frequency channels. Each FDM channel is separated from the others by a frequency guard band to reduce interference between adjacent channels. The OFDM technique differs from traditional FDM in the ways that multiple carriers (called sub-carriers) carry the information stream, the sub-carriers are orthogonal to each other; (i.e. the bandwidths of the individual sub-carriers, are small and arranged so that the maximum of one carrier, corresponds with the first minimum of the adjacent carrier) and a guard time may be added to each symbol to combat the channel delay spread.

FIG. 2 shows an exemplary Frequency-Time representation of an OFDM signal. As can be seen, the signal may be comprised of multiple sub-carriers, each sub-carrier (having a particular bandwidth or frequency range) may carry data (or information) that are represented by symbols with guard intervals therebetween.

The multi-user system comprises both uplinks and downlinks. In the uplink, the network measures the attenuation at the different uplink sub-carriers. On the basis of the measurements made, the network distributes the sub-carriers which the different UEs have to use for uplink transmission. In the downlink, the UE measures the attenuation for each downlink sub-carrier. The result of the measurement is signaled to the network which distributes downlink sub-carriers for better UE reception. In a random access protocol, a UE transmits a known signal sequence (i.e. a specific coded signature) to a base station (Node B). For that, firstly, the UE listens for a pilot channel transmitted by the network, and after detection, the UE synchronizes to OFDM symbols transmitted by the network. Secondly, the UE listens to a broadcast system information channel for a random access sequence and a sub-carrier number assigned to a random access channel (RACH) and then transmits a random access sequence in the random access channel. After transmission for a number of cycles of the random access sequence, the UE checks whether or not, the network has granted the access.

A general overview of the W-CDMA random access procedure will now be considered.

The transport channel RACH and two physical channels PRACH and AICH, are involved in this procedure. The transport channels are the channels supplied from the physical layer to the protocol layer (MAC). There are several types of transport channels to transmit data with different properties and transmission formats over the physical layer. Physical channels are identified by code and frequency in FDD mode. They are normally based on a layer configuration of radio frames and timeslots. The form of radio frames and timeslots depends on the symbol rate of the physical channel. The radio frame is the minimum unit in the decoding process, consisting of 15 time slots. The time slot is the minimum unit in the Layer 1 bit sequence. Thus, the number of bits that can be accommodated in one time slot depends on the physical channel. The transport channel RACH (Random Access Channel) is an uplink common channel used for transmitting control information and user data. It is applied in random access, and used for low-rate data transmissions from the higher layer. The RACH is mapped to the uplink physical channel called the PRACH (Physical Random Access Channel). The AICH (Acquisition Indication Channel) is a downlink common channel, which exists as a pair with the PRACH used for random access control.

The transmission of PRACH is based on a slotted ALOHA approach with fast acquisition indication. The UE selects randomly an access resource and transmits a RACH preamble part of a random access procedure to the network. The preamble is a short signal that is sent before the transmission of the RACH connection request message. The UE repeatedly transmits the preamble by increasing the transmission power every time the preamble is sent, until the UE receives an AI (Acquisition Indicator) on the AICH (Acquisition Indicator Channel), which indicates the detection of the preamble by the network. The UE stops the transmission of the preamble once it receives the AI, and sends the message part at the level of power equal to the preamble transmission power at that point, plus an offset signalled by the network. This random access procedure avoids a power ramping procedure for the entire message. Such power ramping procedure would create more interference due to unsuccessfully sent messages and it would be less efficient due to the larger delay since it would take much more time to decode the message before an acknowledgement could be given that it was received successfully.

The main characteristics of the RACH is that it is a contention based channel, which means that due to simultaneous access of several users, collisions may occur such that the initial access message cannot be decoded by the network. The UE can start the random-access transmission (both preambles and message) at the beginning of an access slot only. This kind of access method is therefore a type of slotted ALOHA approach with fast acquisition indication.

FIG. 3 shows an example of access slots in relation to the transmission of a preamble, a message, and an acquisition indicator (AI).

FIG. 4 shows an example of the number of RACH access slots and their spacing.

Referring to FIGS. 3 and 4, the time axis of both the RACH and the AICH is divided into time intervals, called access slots. There are 15 access slots per two frames (one frame is 10 ms length or 38400 chips) and they are spaced 1.33 ms (5120 chips) apart.

FIG. 5 shows an example of reception of DL AICH and UL PRACH by a UE and the transmission of uplink PRACH access slot by the UL. Namely, FIG. 5 shows the transmission timing relationship between the PRACH and AICH.

FIG. 6 shows a table with the available uplink access slots for different RACH sub-channels.

Referring to FIGS. 5 and 6, the information on what access slots are available for random-access transmission and what timing offsets to use between RACH and AICH, between two successive preambles and between the last preamble and the message is signalled by the network. For example, if the AICH transmission timing is 0 or 1, it will be sent 3 or 4 access slots after the last preamble access slot transmitted, respectively.

Referring to FIGS. 5 and 6, the timing at which the UE can send the preamble is divided by random access sub-channels. A random access sub-channel is a subset comprising the combination of all uplink access slots. There are 12 random access sub channels in total. Random access sub-channel consists of the access slots.

FIG. 7 shows an exemplary format of preamble signatures. The preamble is a short signal that is sent before the transmission of the RACH message. A preamble consists of 4096 chips, which is a sequence of 256 repetitions of Hadamard codes of length 16 and scrambling codes assigned from the upper layer. The Hadamard codes are referred to as signature of the preamble. There are 16 different signatures and a signature is randomly selected (from available signatures sets on the basis of ASC) and repeated 256 time for each transmission of preamble part.

FIG. 8 shows an exemplary structure of a random access message part. The message part is spread by short codes of OVSF codes that are uniquely defined by the preamble signature and the spreading codes as the ones used for the preamble signature. The message part radio frame of length 10 ms is divided into 15 slots, each consisting of 2560 chips.

Each slot consists of a data part and a control part that transmits control information (pilot bits and TFCI). The data part and the control part are transmitted in parallel. The 20-ms-long message part consists of two consecutive message part radio frames. The data part consists of 10*2 k bits (k=0, 1, 2, 3), which corresponds to the Spreading Factor (SF=256, 128, 64, 32).

FIG. 9 shows an exemplary format (structure) of the AICH. The AICH consists of a repeated sequence of 15 consecutive access slots, each of length 40 bit intervals (5120 chips). Each access slot consists of two parts, an Acquisition Indicator (AI) part consisting of 32 real-valued signals $a_0, \ldots, a_{31}$ and a part of duration 1024 chips where transmission is switched off.

When the network detects transmission of an RACH preamble in an RACH access slot with a certain signature, it repeats this signature in the associated AICH access slot. This means that the Hadamard code used as signature on RACH preamble is modulated onto the AI part of the AICH. The acquisition indicator corresponding to signature can take the values +1, −1, and 0, depending on whether a positive acknowledgement a negative acknowledgement or no acknowledgement is given to a specific signature. The positive polarity of signature indicates that the preamble has been acquired and the message can be sent. The negative polarity indicates that the preamble has been acquired and the power ramping procedure shall be stopped, but the message shall not be sent. This negative acknowledgement is used when, due to a congestion situation in the network, a transmitted message cannot not be processed at the present time. In this case, the access attempt needs to be repeated some time later by the UE.

Regarding the random access procedure on protocol layer (L2), the network decides whether the mobile station is to be permitted use of a radio access resource based primarily upon the access class to which the UE belongs. A specified priority level is implied by the Access Class (AC) which is stored on the UE SIM card.

Hereafter, certain aspect of access control will be described. It should be noted that the relevant standard related to this matter is 3GPP TS 22.011.

Regarding the purpose of access control, under certain circumstances, it will be desirable to prevent UE users from making access attempts (including emergency call attempts) or responding to pages in specified areas of a PLMN (Public Land Mobile Network). Such situations may arise during states of emergency, or where 1 of 2 or more co-located PLMNs has failed. Broadcast messages should be available on a cell-by-cell basis indicating the class(es) of subscribers barred from network access. The use of this facility allows the network operator to prevent overload of the access channel under critical conditions. It is not intended that access control be used under normal operating conditions.

For allocation, all UEs are members of one out of ten randomly allocated mobile populations, defined as Access Classes 0 to 9. The population number can be stored in a SIM/USIM for the UE. In addition, mobiles may be members of one or more out of 5 special categories (Access Classes 11 to 15), which also may be stored in the SIM/USIM. These may be allocated to specific high priority users as follows. (This enumeration is not meant as a priority sequence):

Class 15—PLMN Staff;
Class 14—Emergency Services;
Class 13—Public Utilities (e.g. water/gas suppliers);
Class 12—Security Services;
Class 11—For PLMN Use.

For operation, if the UE is a member of at least one Access Class which corresponds to the permitted classes as signalled over the air interface, and the Access Class is applicable in the serving network, access attempts are allowed. Otherwise access attempts are not allowed.

Access Classes are applicable as follows:
Classes 0~9—Home and Visited PLMNs;
Classes 11 and 15—Home PLMN only;
Classes 12, 13, 14—Home PLMN and visited PLMNs of home country only.

Any number of these classes may be barred at any one time.

For emergency calls, an additional control bit known as Access Class 10 is also signalled over the air interface to the UE. This indicates whether or not network access for Emergency Calls is allowed for UEs with access classes 0 to 9 or without an IMSI. For UEs with access classes 11 to 15, Emergency Calls are not allowed if both Access Class 10 and the relevant Access Class (11 to 15) are barred. Otherwise, Emergency Calls may be allowed.

Hereafter, the mapping of Access Classes (AC) will be described. It should be noted that the relevant standard related to this matter is 3GPP TS 25.331.

In UMTS, the Access Classes are mapped to Access Service Classes (ASC). There are eight different priority levels defined (ASC 0 to ASC 7), with level 0 being the highest priority.

For mapping of Access Classes to Access Service Classes, the Access Classes shall only be applied at initial access, i.e. when sending an RRC CONNECTION REQUEST message. A mapping between Access Class (AC) and Access Service Class (ASC) shall be indicated by the information element AC-to-ASC mapping in System Information Block type 5. The correspondence between AC and ASC is indicated in FIG. 10.

FIG. 10 shows a table showing the correspondence between AC and ASC. The no IE designates an ASC number i in the range 0-7 to AC. If the ASC indicated by the no IE is undefined, the UE behaviour is unspecified.

For random access, the parameters implied by the respective ASC shall be employed. In case the UE is a member of several ACs, it shall select the ASC for the highest AC number. In connected mode, AC shall not be applied.

An ASC consists of a subset of RACH preamble signatures and access slots which are allowed to be used for this access attempt and a persistence value corresponding to a probability $P_v \leq 1$ to attempt a transmission. Another important mechanism to control random access transmission is load control mechanism which allows reducing the load of incoming traffic when the collision probability is high or when the radio resources are low.

DISCLOSURE OF INVENTION

Technical Problem

The related art may have problems due to inter-cell interference during random access procedures.

Technical Solution

To solve such problems, the present invention provides random access channel hopping for frequency division multiplexing access systems. As a result, the frequency division multiplexing access system operation can be optimized.

Namely, the present invention provides a method of coordinating resources for repetition of random access bursts performed by a mobile terminal, the method comprising: determining groups of access slots based on parameters from a network, wherein each access slot is defined by any combination of frequency, time and code, and the access slots are organized according to a frequency pattern; transmitting an access burst on an access slot from a chosen group of access slots; and re-transmitting the access burst on the next access slot from the chosen group of access slots.

Also, the present invention provides a method of coordinating resources for repetition of random access bursts performed by a network, the method comprising: configuring parameters that allow a terminal to determine groups of access slots, wherein each access slot is defined by any combination of frequency, time and code, and the access slots are organized according to a frequency pattern; using the configured parameters to determine when resources should not be allocated for other uplink transmissions; and transmitting the configured parameters to the terminal.

BRIEF DESCRIPTION OF THE DRAWINGS

FIG. 6 shows a table with the available uplink access slots for different RACH sub-channels.

FIG. 7 shows an exemplary format of preamble signatures.

FIG. 8 shows an exemplary structure of a random access message part.

FIG. 9 shows an exemplary format (structure) of the AICH.

FIG. 10 shows a table showing the correspondence between AC and ASC.

MODE FOR THE INVENTION

One aspect of the present invention is the recognition by the present inventor regarding the problems and drawbacks of the related art described above. Based upon such recognition, the features of the present invention have been developed.

Although the following description will refer to optimized RACH procedures of UMTS merely for the sake of explanation, the features of the present invention are clearly intended to be applicable to various other types of communication methods and systems that would benefit from employing the particular features of the present invention.

Figure 11:
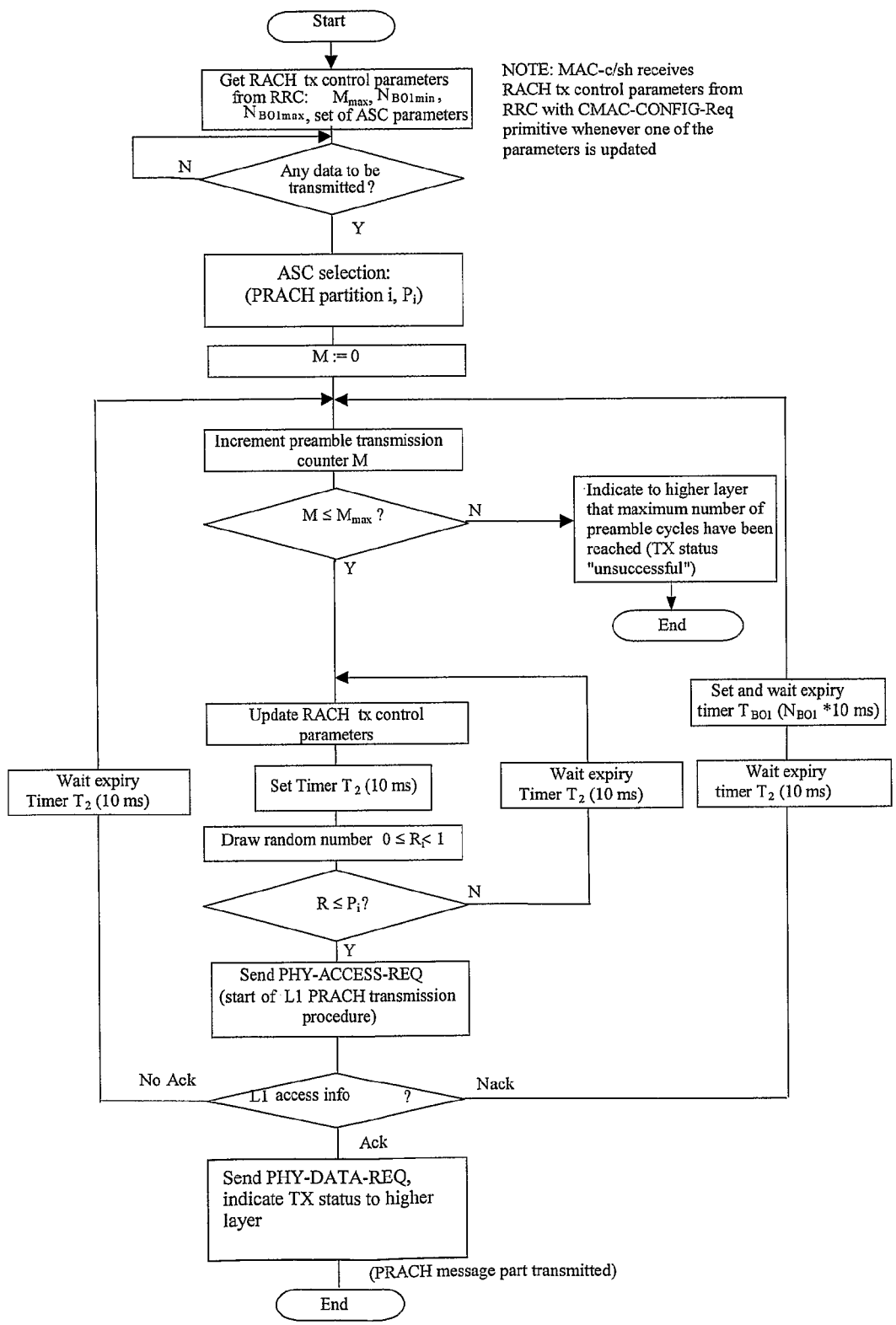
FIG. 11 shows a flow chart of an exemplary control access procedure.

FIG. 11 shows a flow chart of an exemplary control access procedure. It should be noted that the relevant standard related to this matter is 3GPP TS 25.321.

The control access procedure may be performed in the following five steps:

(1) Existing specifications provide many RACH transmission control parameters which are stored and updated by the UE based on system information broadcasted by the network. The RACH transmission control parameters include Physical RACH (PRACH), Access Service Class (ASC), maximum number of preamble ramping cycles Mmax, range of backoff interval for timer TBO1, given in terms of numbers of transmission 10 ms time intervals NBO1max and NBO1min, applicable when negative acknowledgement on AICH is received.

(2) The UE maps the assigned AC to an ASC and a count value M is set to zero.

(3) The count value M is incremented by one. Next, the UE determines if the count value M representing the number of transmission attempts exceeds the maximum number of permitted RACH transmission attempts Mmax. If so, then the UE treats the transmission as unsuccessful.

(4) However, if M is less than or equal to the maximum number of permitted RACH transmission attempts Mmax, then the UE updates the RACH transmission control parameters. In the next step, a 10 ms timer T2 is set. The UE decides whether to attempt transmission based on the persistence value Pi associated with the ASC selected by the UE. Specifically, a random number Ri is generated between 0 and 1. If the random number Ri is less than or equal to the persistence value Pi, the UE attempts to transmit over an assigned RACH resources, otherwise, the UE waits till the 10 ms timer T2 expires and perform again the procedure in step (4).

(5) When one access attempt is transmitted, the UE determines whether the network responds with an Acknowledgement (ACK), a Non Acknowledgment (NACK), or no response. If no response is received from the network, after the timer T2 expires the process is performed again from step (3). If a NACK, indicating a failed receipt of the transmission by the network often due to collision, is received, then the UE waits for the timer T2 to expire then generates a back off value NBO1 randomly chosen between the maximum and minimum back off values NBO1max and NBO1min associated with the PRACH assigned to the UE. The UE then waits a back off interval TBO1 equal to 10 ms times the back off value NBO1 before to perform again the process from step (3). If an ACK, indicating receipt of the UE transmission by the network, is received, then the UE begins the message transmission.

Hereafter, the random access procedure on the physical layer (L1) will be described.

The physical random access procedure is initiated upon request from the MAC sub layer (L2).

Before the physical random-access procedure can be initiated, Layer 1 shall receive the following information from the higher layers (RRC):

The preamble scrambling code.
The message length in time, either 10 or 20 ms.
The AICH_Transmission_Timing parameter [0 or 1].
The set of available signatures and the set of available RACH sub-channels for each Access Service Class (ASC).
The power-ramping factor Power Ramp Step [integer>0].
The parameter Preamble Retrans Max [integer>0].
The initial preamble power Preamble_Initial_Power.
The Power offset P p−m=Pmessage−control Ppreamble, measured in dB, between the power of the last transmitted preamble and the control part of the random-access message.
The set of Transport Format parameters. This includes the power offset between the data part and the control part of the random-access message for each Transport Format.

At each initiation of the physical random access procedure, Layer 1 shall receive the following information from the higher layers (MAC):

The Transport Format to be used for the PRACH message part.
The ASC of the PRACH transmission.
The data to be transmitted (Transport Block Set).

The physical random-access procedure is performed according to the procedures (steps) below:

1. In the random access sub-channel that can be used for the ASC concerned, one access slot is chosen randomly from access slots that can be used in the next full access slot sets2. If there are no access slots available, one access slot is chosen randomly from access slots that can be used in the next full access slot sets.

2. One signature is randomly chosen from the set of available signatures within the given ASC.

3. The preamble retransmission counter is set at Preamble Retrans Max, which is the maximum number of preamble retransmission attempts.

4. The preamble transmission power is set at Preamble Initial Power, which is the initial transmission power of the preamble.

5. The preamble is transmitted on the basis of the chosen uplink access slot, signature and set transmission power.

6. If no "ACK" or "NACK" corresponding to the selected signature is detected in the downlink access slot corresponding to the selected uplink access slot.

The next available access slot is selected from the random access sub-channel within the given ASC.
A new signature is randomly selected from the available signatures within the given ASC.
The preamble transmission power is increased by Power Ramp Step, which is the step width of the power ramping.
The preamble retransmission counter is reduced by 1.
The procedures from step 5 are repeated for the duration in which the preamble re-transmission counter exceeds 0.
When the retransmission counter reads 0, the higher layer (MAC) is informed of the fact that ACK has not been received on AICH, and the random access control procedures in the physical layer are finished.

7. If NACK corresponding to the selected signature is detected in the downlink access slot concerned, the higher layer (MAC) is informed of the fact that NACK has been received on AICH, and the random access control procedures in the physical layer is finished.

8. The random access message is transmitted 3 or 4 uplink access slots after the uplink access slot of the last transmitted preamble depending on the AICH transmission timing parameter. The transmission power of the control channel of the random access message is set at a level higher than the transmission power of the last preamble transmitted by power offset.

9. The higher layer is informed of the transmission of the random access message, and the random access control procedures in the physical layer are finished.

Figure 12:
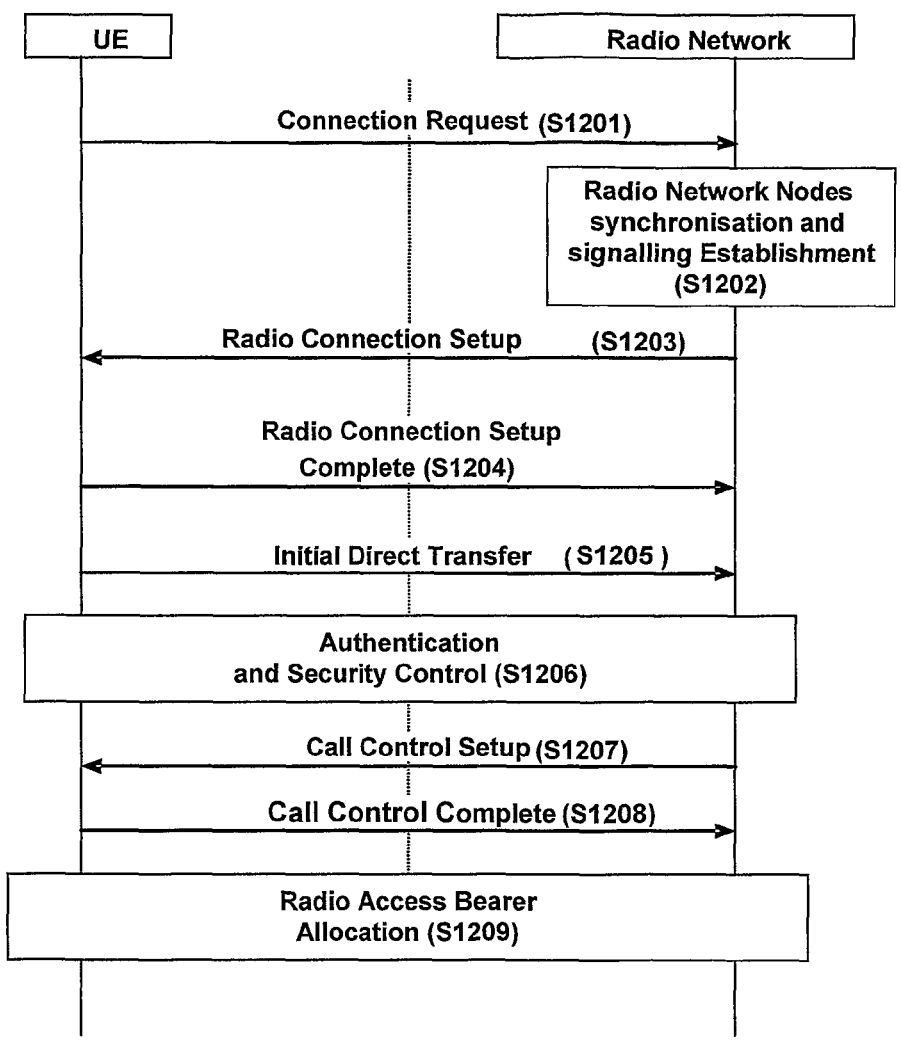
FIG. 12 shows an exemplary signal flow for Signalling Establishment.

FIG. 12 shows an exemplary signal flow for Signalling Establishment.

Once the PRACH power control preambles have been acknowledged the RRC Connection Request message can be transmitted (S1201). It contains the reason why the connection is requested.

Depending on the request reason the radio network makes a decision of the kind of resources to reserve and perform synchronization and signalling establishment among radio network nodes (i.e. Node B and serving RNC) (S1202). When the radio network is ready it sends to the UE the Connection Setup message conveying information about radio resource to use (S1203). The UE confirms connection establishment by sending the Connection Setup Complete message (S1204). When the connection has been established the UE sends the message Initial Direct Transfer including information containing, amongst others, the UE identity, current location are and the kind of transaction requested (S1205). Then the UE and network authenticate each other and establish security mode communication (S1206). The actual set up information is delivered through the Call Control Setup message (S1207). It identifies the transaction and indicates the QoS requirements. Upon receiving the message the network starts activities for radio bearer allocation by checking if there are enough resources available to satisfy the requested QoS. If yes, the radio bearer is allocated according to the request. If not, the network may select either to continue allocation with lower QoS value, or it may select to queue the request until radio resources become available or to reject the call request (S1208, S1209).

In wireless systems, a random access (performed on RACH, random access channel) is the method used by the UE to initiate a call, to establish signaling and short data transfer with the network.

In order to improve spectral efficiency, a new uplink (transmission from a UE to network) scheme is under study within the 3GPP Long Term Evolution framework. For the uplink, a multi-carrier (OFDMA) system or a single carrier (localized or distributed FDMA) system with cyclic prefix and frequency domain equalization could be candidates. The different carriers could be distributed to the UEs. In these systems, a set of sub-carrier frequencies is assigned to each uplink communication link within a cell. The set of sub-carrier frequencies allocated to each communication link is chosen from all sub-carrier frequencies available to the system. In order to reach spectral efficiency targets, a new air interface is assumed to achieve a frequency re-use of 1 like WCDMA does. In such an orthogonal system, the intra-cell interference between sub-carriers within the same cell does not occur.

However, it is possible that inter-cell interference occurs, caused by the use of the same sub-carrier frequency in adjacent cells.

In these systems, no method exists for coordinating the assignment of sub-carrier frequencies to RACH communications links based on interference coordination technique, in order to maximize the probability of correct detection and minimize false detection of random access sequence As such, the present invention provides the following conceptual ideas. The first aspect of the present invention provides a method of selecting RACH channels dedicated to random access, the method comprising planning a set of uplink sub carrier groups (RACH channels as described below) according to the path loss level or other measurements. Other metrics in correlation with path loss like SNR, received signal level (Rx level), interference level, etc. are possible candidates.

Figure 13:
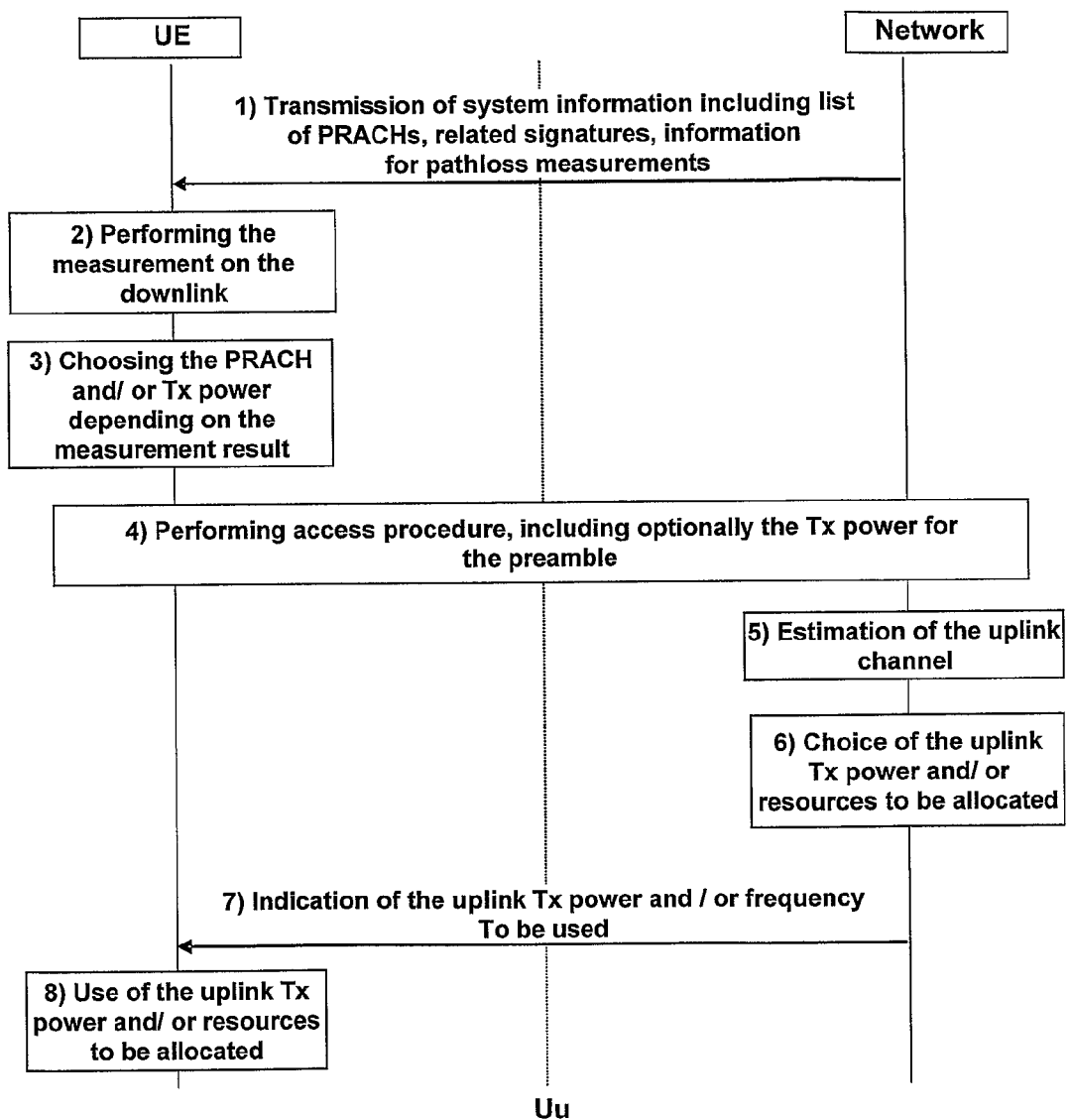
FIG. 13 shows an exemplary procedure according to the present invention.

FIG. 13 shows an exemplary procedure according to the present invention. The processing between the UE (terminal) and the network is shown.

The network transmits system information to the UE (Step 1). System information may include a list of PRACHs, related signatures, information for path loss measurements, and the like. Then, the UE performs measurements on the downlink (Step 2). The UE then chooses the PRACH and/or transmission power depending on the measurement result (Step 3). Thereafter, the UE and the network cooperate to perform access procedures (Step 4). Here, the transmit power for the preamble may be optionally included. Then, the network performs estimation of the uplink channel (Step 5). Thereafter, the network chooses the uplink transmit power and/or resources to be allocated (Step 6). The network then transmits to the UE, an indication of the uplink transmit power and/or frequency to be used (Step 7). The UE then uses the uplink transmit power and/or resources to be allocated (Step 8). It is clear that additional and/or alternative steps may be performed.

Figure 14:
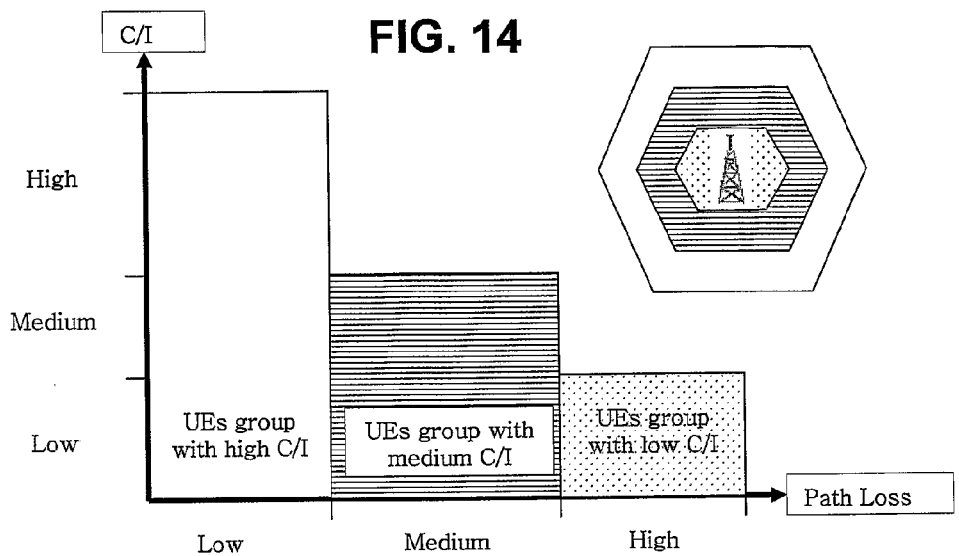
FIG. 14 shows an example of RACH frequency planning within one cell.

FIG. 14 shows an example of RACH frequency planning within one cell. The UEs located in certain portions of a single cell may have different degrees of path loss and levels of carrier-to-interference ratio (C/I). With respect to a single cell, three regions may exist. Namely, the central region may be for UEs with low C/I but high path loss; a boundary (or periphery) region may be for UEs with high C/I but low path loss; and an intermediate region (i.e., between the central region and the boundary region) may be for UEs with medium C/I and medium path loss. It is clear that more or less degrees path loss and/or levels of C/I may be used.

Here, it should be noted that the depicted hexagons are merely exemplary for rep-resenting cells of a cellular network. It can be understood that the actual shapes of the cells may vary due to various factors, such as geographic location, signal usage, desired coverage area, and the like.

Figure 15:
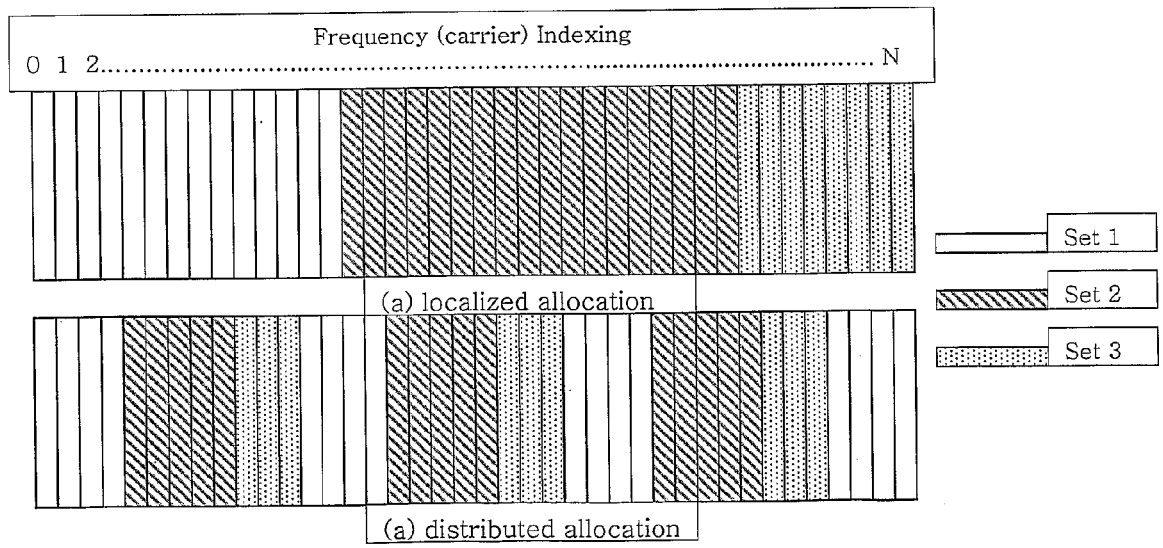
FIG. 15 shows an example of RACH radio frequencies (carrier) arrangement.

FIG. 15 shows an example of RACH radio frequencies (carrier) arrangement. The RACH radio frequencies (with indexing from 0 through N) may be divided into three sets (Set 1, Set 2, Set 3). These sets of RACH radio frequencies may be allocated in (a) a localized manner or in (b) a distributed manner. It is clear that other types of allocation may be employed.

Figure 16:
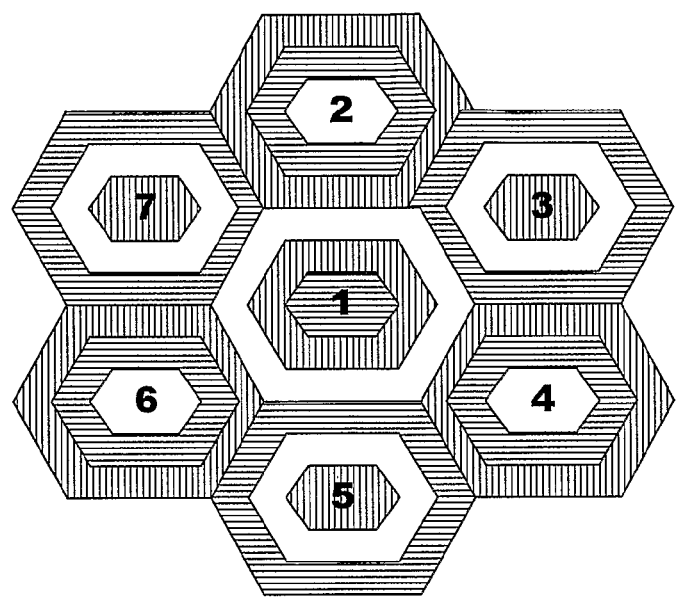
FIG. 16 shows an example of RACH frequency planning within the network deployment for frequency reuse.

FIG. 16 shows an example of RACH frequency planning within the network deployment for frequency reuse. Referring back to FIGS. 14 and 15, the cells may have different configurations and planned in a particular manner. For example, cell 1 may have three regions; a central region for UEs with high C/I but low path loss, a boundary region for UEs with low C/I but high path loss, and an intermediate region for UEs with medium C/I and medium path loss. Around cell 1, there may be six cells. A first set of cells (cells 2, 4, 6) may have a central region for UEs with low C/I but high path loss, a boundary region for UEs with medium C/I and medium path loss, and an intermediate region for UEs with high C/I and low path loss. Also, a second set of cells (cells 3, 5, 7) may have a central region for UEs with medium C/I and medium path loss, a boundary region for UEs with high C/I and low path loss, and an intermediate region for UEs with low C/I and high path loss. The cells of the first and second sets may alternate as shown. However, it is clear that other cell arrangements, as well as additional and/or alternative regions for each cell are possible.

Figure 17:
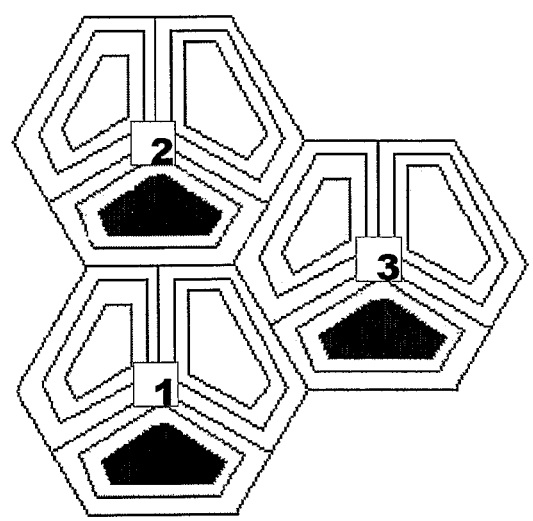
FIG. 17 shows an example of RACH frequency planning within the network deployment for fractional reuse.

FIG. 17 shows an example of RACH frequency planning within the network deployment for fractional reuse. Here, fractional reuse may refer to when each cell may be divided into three sectors, where each sector may have a central region, an intermediate region, and a boundary region. Three cells (Cells 1, 2, 3) may be planned as shows in FIG. 17.

The features of the present invention will be explained in more detail with reference to FIGS. 13 through 17.

The path loss expresses the attenuation undergone by the signal between the transmitter and receiver due to many effects such as distance free-space loss and several faded paths due to reflection, refraction, absorption, etc. In the same manner as the related art, the UE reads in system information on a broadcast channel the power level used on the common pilot channel. The present uplink interference level could be also read in the same way. It measures the received power on the common pilot channel. By subtracting the received pilot power from the transmitted pilot power, an estimate of the path loss can be obtained.

$$\text{Path loss}_{dB} = T_x\text{level} - R_x\text{level}$$

where $T_x$ level is the effective transmit power level (taking into account maximum output power and all gain and losses, i.e.: gain of transmitted antenna, cable losses), and $R_{x\ level}$ is the measured power level (taking into account the gain of the received antenna and interference received level).

Alternatively, also the difference of a measurement of the target cell and the measurement of neighbouring cells could be used in order to decide on the RACH channel that could be used.

Out of the set of available RACH channels, the UE selects the set of allowed channels to be used as shown below.

Set of RACH channels allowed=$f$(any metrics in correlation with path loss or other measurements as described above of one or several cells, available RACH channels)

Out of the set of allowed channels, the UE could then select one RACH channel based on any algorithm.

RACH channel=$f$(UE decision, e.g. hash function on UE-ID, random function, etc.)

With the estimated path loss and interference power level the UE can calculate the necessary transmit power needed to achieve a certain SNR at the network side. This SNR target should be indicated by the network. During the RACH procedure it would be possible to indicate to the network the used Tx power/a range of the path loss or other measurement in order to allow the network to choose the best uplink resources (i.e. frequency and/or time and/or code pattern).

Another aspect of the present invention is to provide a particular RACH procedure. Namely the present invention may be implemented in the following manner.

A different RACH radio frequency or set of radio frequencies are planned within the cell according to a particular criteria, which could be QoS, path loss, SNR, received signal level (Rx level), interference level, etc. Different thresholds could be applied for different RACH resources. The particular threshold, determines which RACH resources are allowed for use. Then the UE selects one of the RACH resources, according to a specific method to perform random access.

Some specific examples applicable to the present invention are as follows:

RACH channels can be defined through the various combinations of radio resources in frequency domain (e.g. by a specific sub-carriers), in time domain (e.g. time durations defined by start and stop instants), in code domain (e.g. defined by a specific code sequence), or mixtures thereof. For example RACH channel can use a combination of frequency and time division pattern which could be defined as a sequence of frequencies and timeslots. The frequency sequence is determined by that in a given cell there is, for a RACH channel assigned to a particular UE a correspondence between frequency and radio frame. A given RACH channel could use the same or different timeslot in every radio frame. The timeslot sequence is defined by a timeslot number and/or frame number sequence. These parameters should be broadcasted (or derived from parameters broadcasted) by the network.

RACH resources in frequency domain can be defined as a subset of M allowed frequencies allocated from a larger group of N frequencies that are available for communication links within the cell. The number M depends on the required RACH capacity and could change over time, for example when the network detects that a random access channel is used, the used frequency could be removed from the allowed channel or may just be indicated as non-free or busy. At the network side, the subset of M allowed frequencies can be arranged according several path loss threshold levels, either in a localized way where frequencies are grouped together over part of the entire band or in a distributed way where the frequencies are equally spaced over the whole band as shown in FIG. 14. Path loss at a distance is known to follow a so-called distance power law, i.e. the received signal decreases as $d^{-\alpha}$ and depends to some extend on the frequency band in use, the antenna height and shape, both of the UE and the base station. Regarding path loss, there exist a number of experimental models, of which the model by OKUMURA & HATA being the most famous. This model basically describes that the path loss increases as the distance increases. This means that the received signal strength is greater in the vicinity of the cell center and decreases with distance from the cell center. Thus, at the network side, for a given frequency band, a given antenna height, a given environment, the following very simple formula can be used in order to arrange M allowed frequencies according to several path loss levels:

Path loss $dB = C + 10\alpha \log d$ where C is a constant, d is a distance and α is the propagation exponent with the value depending of channel model and is usually in a range of 2 to 4.

Figure 1:
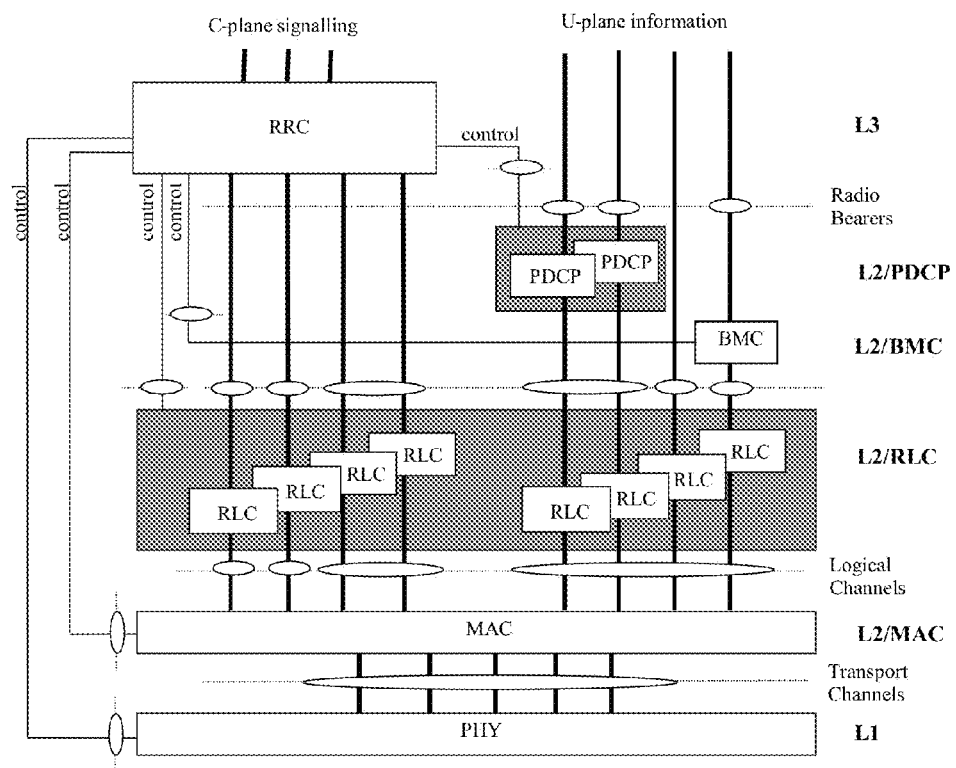
FIG. 1 shows the radio interface protocol architecture according to the 3GPP radio access network standards.
Figure 2:
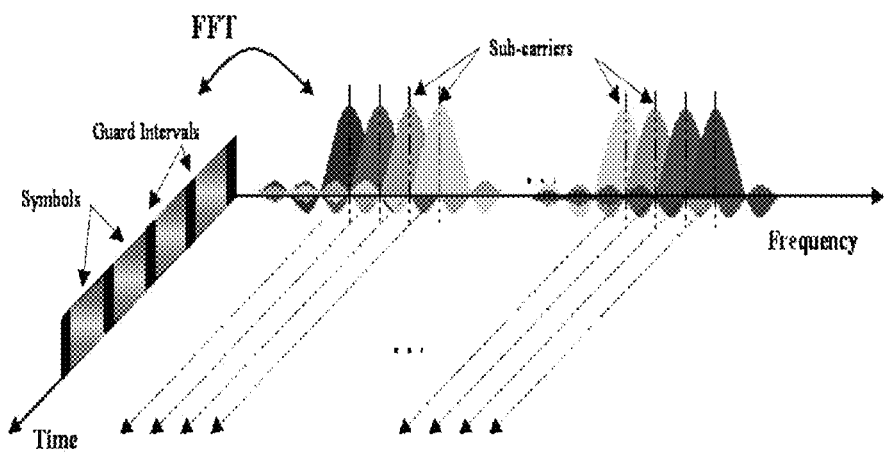
FIG. 2 shows an exemplary Frequency-Time representation of an OFDM signal.
Figure 3:
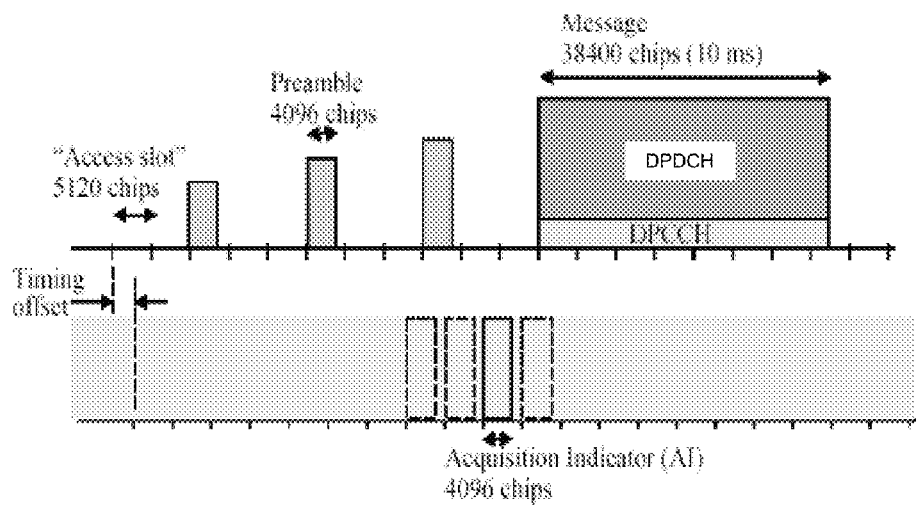
FIG. 3 shows an example of access slots in relation to the transmission of a preamble, a message, and an acquisition indicator (AI).
Figure 4:
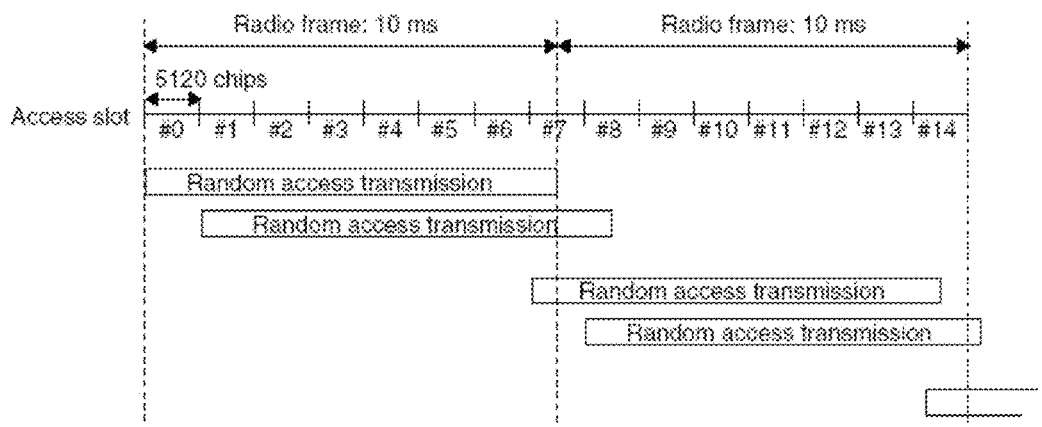
FIG. 4 shows an example of the number of RACH access slots and their spacing.
Figure 5:
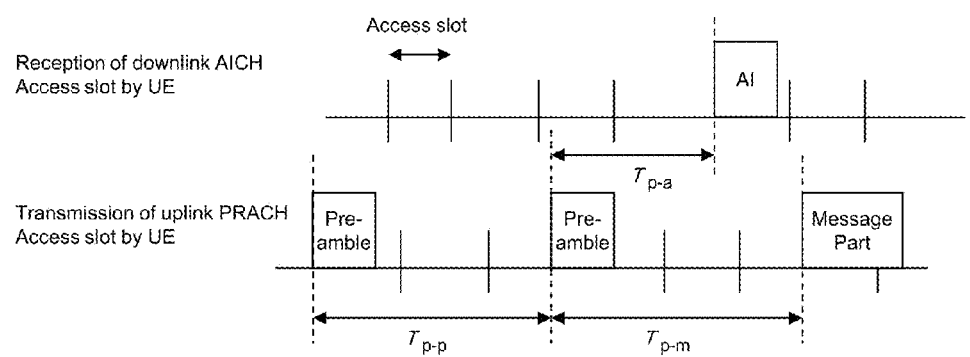
FIG. 5 shows an example of reception of DL AICH and transmission UL PRACH by a UE.

One main concept of the present invention is that at the UE side, each UE uses different RACH channels according to the path loss (SNR, received signal level (Rx level), interference level) of a received signal in the downlink as shown in FIG. 1. Each UE within the cell estimates the path loss. According the estimated path loss the UE determines which frequency sub-sets are allowed to perform random access. This could be done e.g. based on thresholds broadcast on system information, e.g. for each RACH channel the minimum/maximum measured value could be given. Thus different groups of UEs can be created in this way using different frequency or sets of frequencies, as shown in FIG. 15.

RACH resources in time domain could be defined from a predetermined number of time offsets indicating when a UE can start the random access procedure. In this example where RACH resources are defined through the combinations in frequency and time domain, the RACH channel could consist of M RACH allowed frequencies (as described above) mapped on the T RACH time offsets. There could be defined per cycle (the cycle could be one or more radio frames), S time offsets per allowed frequencies. In order to determine the S available time offsets for each allowed frequency, the following formula may be applied:

$$TimeOffset = \left[AllowedFrequencie_j + \left(k \times \frac{T}{S}\right)\right] \% \ T$$

with: $j = 0, 1, 2, 3, \ldots M; k = 1, 2, 3, \ldots S$

On the other hand, per M allowed frequencies cycle, each time offset could be defined in order to appear in C different frequencies. In order to determine in which frequencies it appears, the following formula may be applied:

$$AllowedFrequencie = \left[TimeOffset_i + \left(n \times \frac{M}{C}\right)\right] \% \ M$$

with: $i = 0, 1, 2, 3, \ldots T; n = 0, 1, 2, 3, \ldots C$

The random access procedure may involve the following elements:

In the uplink, it consists of one or more access preambles (AP) and/or collision preambles (CP) and/or message parts that contain data and control information. The access preamble is a predefined sequence called a signature. There could be $Z_{max}$ of available access signatures. All signatures can in principle be used for a random access (if not prohibited by the system). It could be possible to detect several access attempts with different signatures simultaneously, and also acknowledge them on the access indicator channel (AICH) simultaneously. Collision detection preambles may be sent for collision detection. Collision detection preambles may be sent for collision detection before the message is transmitted. A collision detection signature could be shared with the access signature or be completely different. In case where a collision detection preamble is not used, collision resolution could be done (performed) by a higher layer after the message part is received. Note that in the case of UE based decision, the AP and CP could carry additional information like the channel which will be used for transmission, transmission power level, present downlink interference level, etc.

In the downlink, one or more access indicators (AI) could be sent. The AI signal is transmitted from the network in response to the access preamble detection. When operating properly, the network recognizes an access preamble from the UE and responds with an AI to establish a communication link. The access indicator is defined such that it identifies the signature that it responds to, and one implementation could be to use the identical signature sequence as the access preamble to which the response belongs. In the case where the collision detection preamble is used, the collision indicator (CI) could be used for supporting the collision detection function. Similarly, as the AI uses the AP signature sequence in response, the CI could use the CD signature sequence. Additional information could be included within the AI (and CI), as for instance:

channel to use for message transmission, time waiting before message transmission called timing advance (TA) used to derive the correct value for timing advance that the UE has to use for the uplink transmission, transmission power level to use or present uplink interference level, and the like.

The random access procedure could be divided into several phases (phases A) through G) shown):

A) The UE shall start listening to the broadcast channel in order to obtain RACH control parameters. The purpose of the RACH control parameters is to provide parameters used to control the RACH utilization. Theses parameters should be any of the following:

(1) Access Service Class (ASC) and associated persistence value (like the related art).

(2) The set of available RACH channels (or channel groups, the channels could be arranged in time-frequency domain as described above).

(3) The RACH Allocation Index Offset (RAIO), allowing calculation of the offset for the next RACH channel during preamble retransmission (can be seen as RACH hopping).

(4) The access preamble parameters:

a) The set of available access signatures. The same or different signatures can be allocated for each RACH channels group.

b) The maximum number of retransmissions allowed.

c) A parameter used for calculation of the minimum number of time-offsets between the transmission of two preambles.

d) The preamble power, whether the preamble power ramping is not used, it could be the same for each preamble retransmission e) If the preamble power ramping is used:

i) The initial preamble power ii) The power step between preambles power.

(5) If collision resolution is performed in the physical layer, the collision preamble parameters, they could be like access preamble parameters with same or different parameters values.

(6) The Power offset between the access (or collision) preamble part and the message part.

(7) The number of time-offsets to spread transmission of the message part.

(8) The present uplink interference level could be indicated also.

(9) For each uplink channel, thresholds should be given for the downlink measurement object (e.g. minimum/maximum measured value, where the measured value could be any of path loss, SNR, received signal level (Rx level), interference level, etc, or differences of the measured values between different cells, e.g. difference between the cell with the RACH channel and a neighboring cell).

(10) Offsets for the calculation of the measured values, e.g. difference of the pilot power of the current and the neighboring cell etc.

B) The UE measures the received power on the common pilot channel. By subtracting the received pilot power from the transmitted pilot power, it can obtain an estimate of the path loss. With estimated path loss UE knows which RACH channels groups are allowed to be used.

C) The UE selects randomly one of RACH channel from the group it is allowed to use. Furthermore, the access preamble signatures are also selected randomly amongst the available signatures.

D) An access preamble is sent with the selected signature. It could include additional information (in a case of UE based decision) on the next RACH channel which will be used for transmission, transmission power level, present downlink interference level, etc.

E) The UE decodes the acquisition indicator (AI) to see whether the network has detected the access preamble.

F) In case no AI is detected, the UE could select another signature and if power-ramping is used, the UE increases the access preamble transmission power by steps given by the network; else the same power level could be kept for preamble re-transmission. The access preamble could be retransmitted either:

(1) in the next available RACH channel from the group;

(2) in the RACH channel according RAIO (RACH Allocation Index Offset);

(3) in the same RACH channel as previous transmission; or (4) in the RACH channel from another group if no prohibited by the system.

G) When an AI is detected, the UE either starts a collision detection preamble (if collision resolution is performed on physical layer) or message transmission (if collision resolution is performed on a higher layer).

(1) In a case of collision detection preamble, after an AI is detected, a CP with the same power level as the last AP is transmitted with another signature selected randomly. The CP could be transmitted in one of the RACH channels as described above (see previous point on access preamble retransmission). The network is expected to echo the CP signature on the CI and in this way reducing the collision probability on physical layer (L1).

(2) The message part could be transmitted either in the RACH channel according the one of method as for preambles transmission or in another specific channel which could be indicated in a AI or CI (see above regarding the additional information elements which could be included in the AI and/or CI) or by another network channel. The random access message is transmitted according the number of time-offsets to spread transmission of the message part as indicated by the network. Note that HARQ methods could be used for data block acknowledgement during this period.

FIGS. 18 through 23 show examples of RACH sub-carrier allocation and some simulation results.

Simulations are performed in a system bandwidth of 10 MHz (the FFT size is 1024) with a carrier frequency of 2 GHz. The channel is a TU with 6 taps and the mobile velocity is 3 km/h. The signatures are pseudo noise codes.

With respect to RACH sub-carrier allocation, localized versus distributed mapping scheme is compared with the estimation of the timing offset by performing a simple correlation in the time domain.

Figure 18:
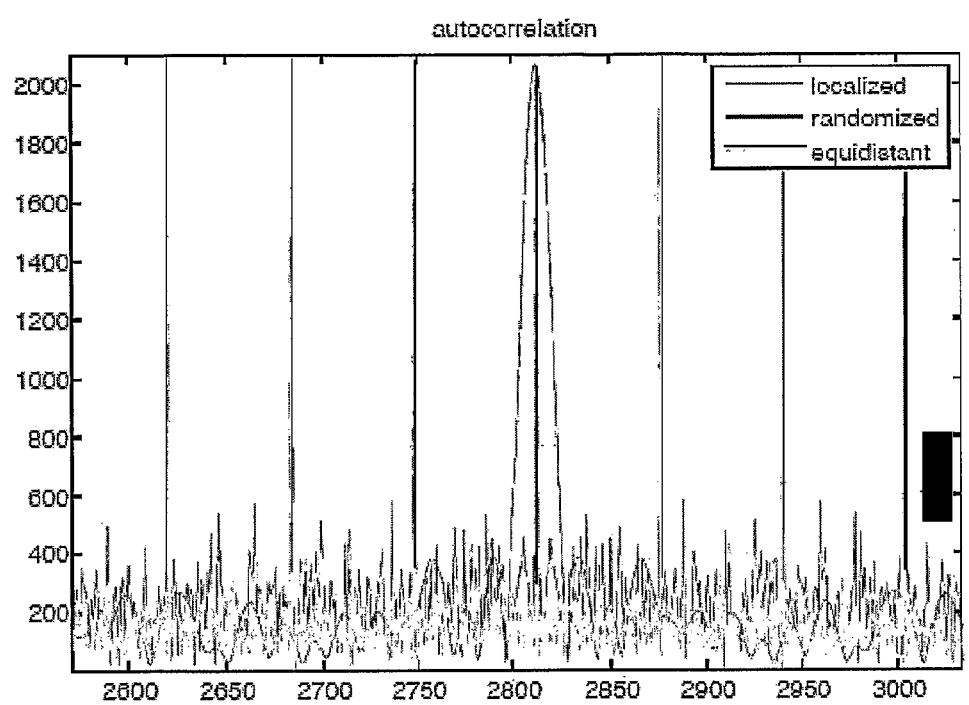
FIG. 18 represents the autocorrelation function of a given signature for each (mapping) scheme, namely, for localized, randomized, and equidistant mapping.

FIG. 18 represents the autocorrelation function of a given signature for each (mapping) scheme, namely, for localized, randomized, and equidistant mapping.

The autocorrelation with the equidistant scheme presents several peaks, equally separated, thus a wrong estimation can be made, leading to a shifted timing estimation. For the localized mapping scheme, the autocorrelation function presents a lobe which is smaller than the typical CP duration, therefore the error induced for estimation of timing offset can be considered as not significant.

Therefore, a localized scheme is proposed for RACH sub-carrier allocation. The sub-carriers allocation to the UE should be based at least on path loss criteria for RACH inter-cell interference coordination. This would allow that UEs that are close to the base station and that potentially create little interference to neighbouring cells could be allocated to specific sub-carriers as signalled by network, and the UEs that are at the cell edge that might create much interference would be allocated to other sub-carriers.

Figure 19:
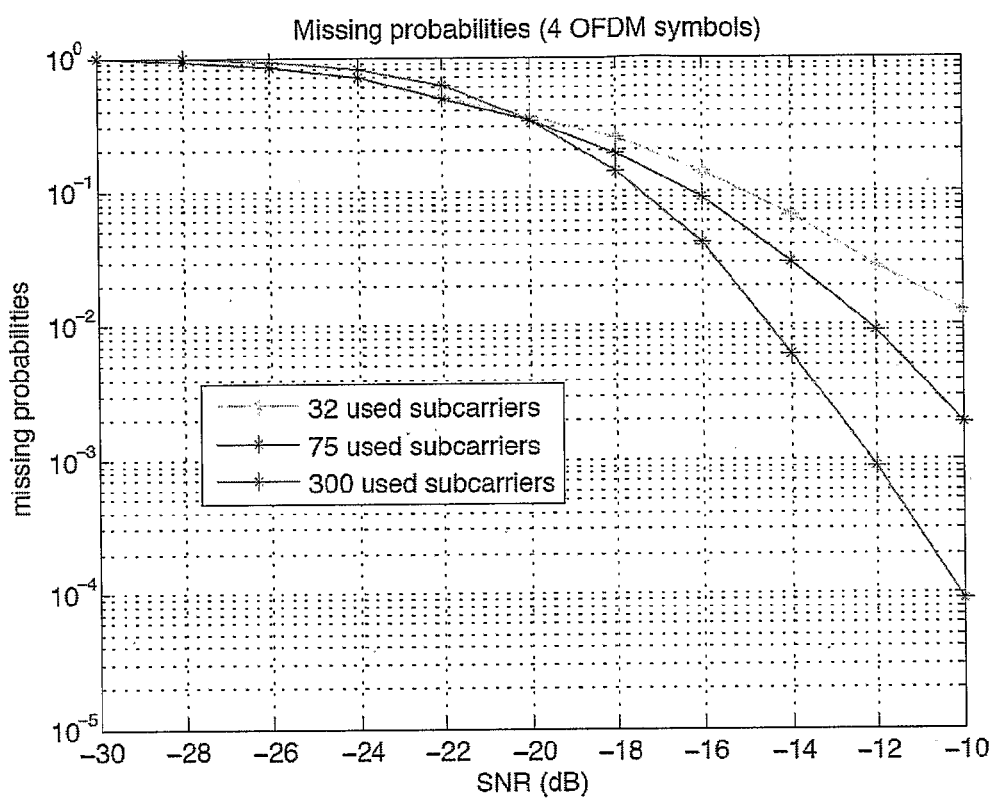
FIG. 19 shows an example of the probability of missing a signature.

FIG. 19 shows an example of the probability of missing a signature. Hereafter, the bandwidth of the RACH signature will be considered. In the simulations performed by the inventors, one attempt every 5 TTI is considered. As expected, transmission bandwidth of 5 MHz leads to better detection performance since the number of sub-carrier is higher.

Figure 20:
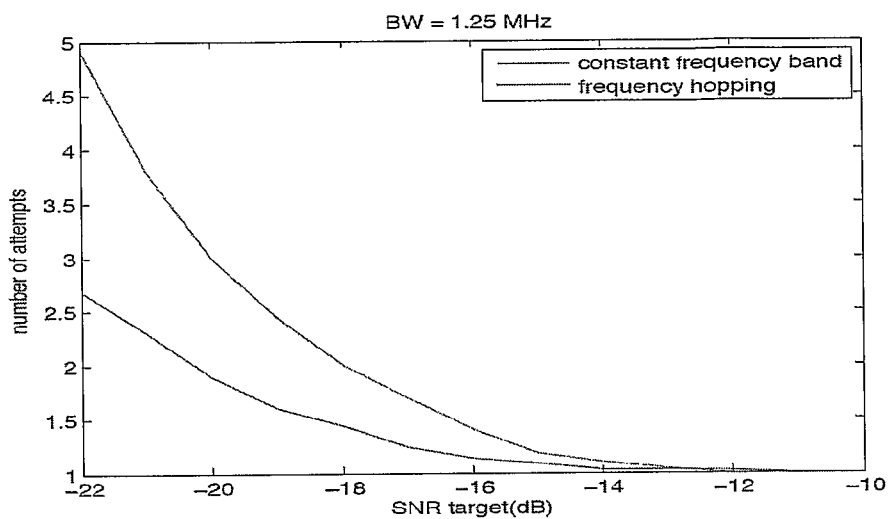
FIG. 20 show the average number of RACH attempts when a constant frequency band and frequency hopping are used for a bandwidth of 1.25 MHz.
Figure 21:
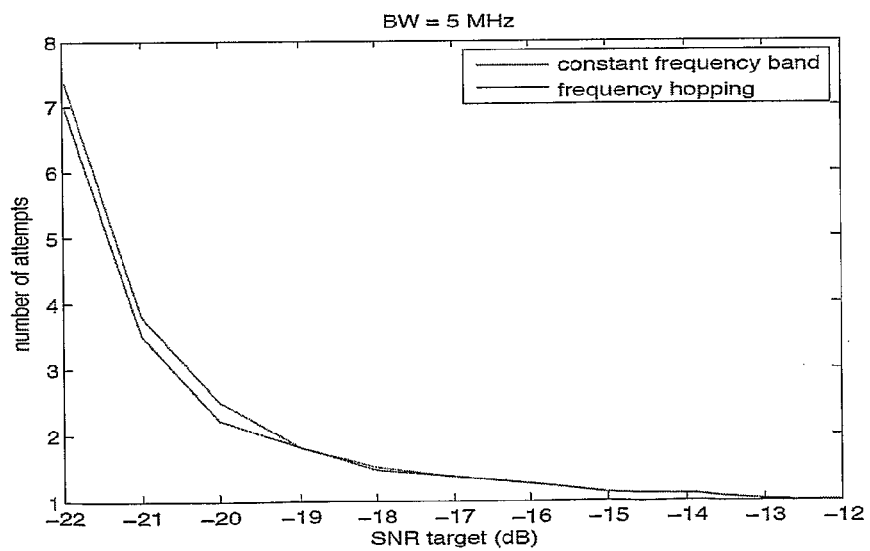
FIG. 21 show the average number of RACH attempts when a constant frequency band and frequency hopping are used for a bandwidth of 5 MHz.

FIGS. 20 and 21 show the average number of RACH attempts when a constant frequency band and frequency hopping are used for a bandwidth of 1.25 MHz and 5 MHz, respectively.

When frequency hopping is used, the RACH Tx bandwidth of 1.25 MHz is also quite efficient, as shown by the simulation results in the TU channel comparing signatures with 1.25 MHz bandwidth and 5 MHz bandwidth. For efficient use of resources, with a SNR target for an average number of 2 transmissions, frequency hopping allows achieving of similar performance with 1.25 MHz as with 5 MHz. i.e., the same UE power, but fewer sub-carriers reserved for the RACH. Therefore, the use of a RACH Tx bandwidth of 1.25 MHz is proposed for the present invention.

Figure 22:
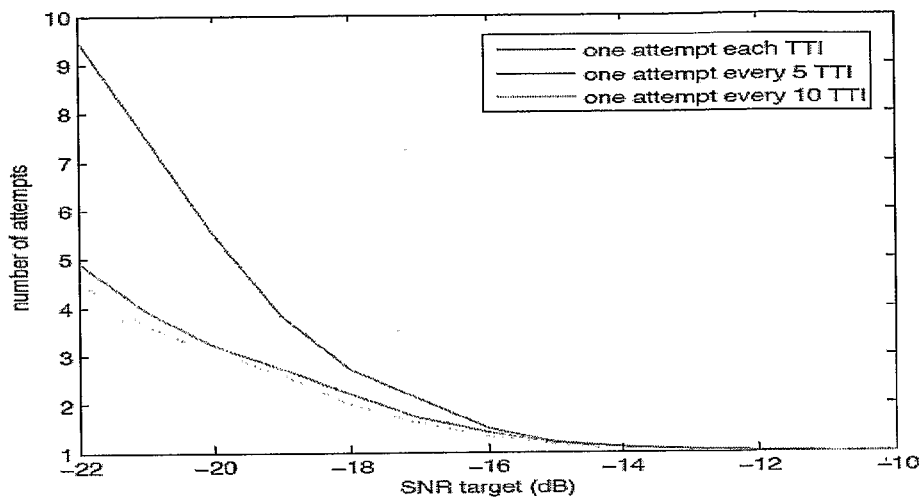
FIG. 22 shows a comparison of delays between successive attempts, whereby one attempt is performs for each TTI, for every 5 TTI, and for every 10 TTI.

FIG. 22 shows a comparison of delays between successive attempts, whereby one attempt is performs for each TTI, for every 5 TTI, and for every 10 TTI. The impact of the delay between the above described two attempts is explained. The necessary number of attempts to access the network represents the performance measure. The RACH procedure is performed until the signature is detected. A signature length of 4 OFDM symbols is considered. The pedestrian channel (3 km/h) is simulated. As the channel varies slowly with time, and the process benefits from time diversity, the performances in terms of the number of attempts are better for larger delay.

Figure 23:
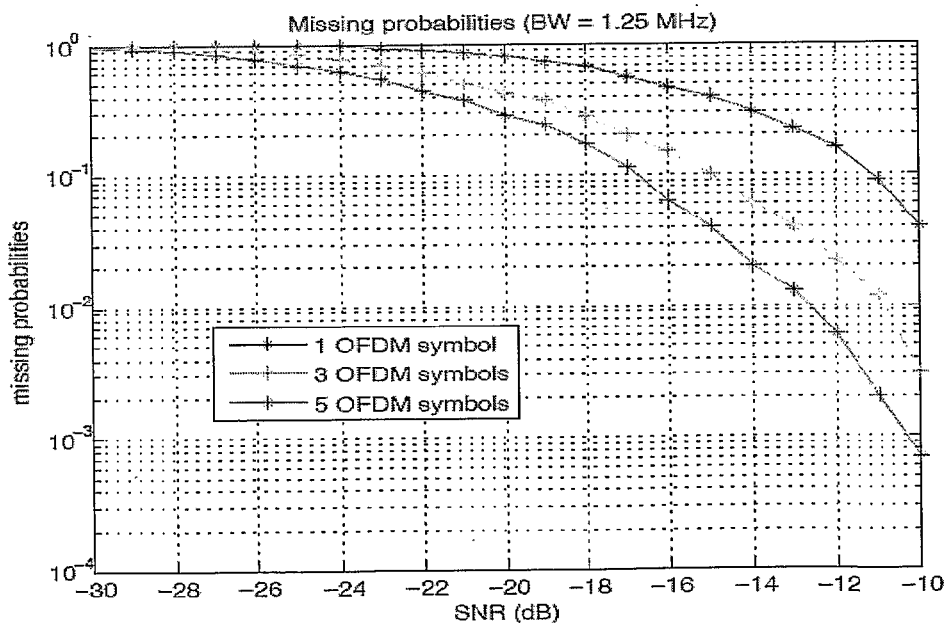
FIG. 23 shows the relationship between missing probabilities and SNR for different RACH burst sizes (i.e., number of OFDM symbols).

FIG. 23 shows the relationship between missing probabilities and SNR for different RACH burst sizes (i.e., number of OFDM symbols). Regarding the RACH burst size, the signature duration is a key parameter in the random access design. The longer the signal is, the better the detection will be. However, the need of a guard time and the potential payload size should be taken into account. The missing probabilities are provided for signature length of 1, 3 and 5 OFDM symbols.

For the SNR value below −10 dB, the missing probabilities seem reasonable with 3 and 5 five OFDM symbols. However, the maximum number of symbols is limited to 4 due to round trip delay by the LTE requirement for cell sizes of 30 km.

The data part included in a RACH burst can require several retransmissions when the terminal is in a poor coverage area, which increase the access delay and decrease the access capacity due to RACH resources occupancy. For this reason the transmission of data part will be more efficient on uplink shared channels Node B controlled. However benefits to have small payload part (e.g. to help collision detection) have to be considered.

In the LTE system the RACH access procedure can be used for two purposes: (1) Control of time adjustment; and (2) Initial access (i.e., switch on, cell reselection, transition from idle to active mode, etc.).

However, because the control of time adjustment needs further study, only the initial access part will be considered hereafter.

Contrary to Release 99, transmission of significant payload on a congestion based channel is not the most efficient thing to do. Rather, at initial access, the main purpose should be to detect the UE, calculate the necessary timing alignment, and allocate uplink resources for the UE.

For inter-cell interference mitigation, one proposal would be to define in each cell, sets of RACH channels which would use different sub-bands. For random access, the UE should then choose one of the available sub-bands based on the path loss that the UE measures, such that UEs with large (or high) path loss (i.e., UEs which are far from the base station) would use a specific sub-band, such that the major UL interference is localized in this sub-band. Inside one sub-band, the choice of the available resources could be made in a random manner.

During the random access procedure, the UE transmits a RACH burst and the network measures the received signal from terminal (UE). Then, the network sends a timing advance (TA) command, which commands the terminal to adjust its uplink transmission timing accordingly. A second RACH transmission may be done to verify the adjusted time offset and possibly help for collision resolution. Once synchronisation is obtained, a message part is sent on the uplink shared resources, which are scheduled by a Node B.

Whether there is need for a resource request or to maintain time synchronisation in the uplink, RACH or control signalling resources can be used.

Once the signature is sent, the UE should wait for the reception of a response message (including ACK/NACK/Timing Adjustment). If the uplink system band and the downlink system band are the same, a one-to-one mapping for the resources for the RACH signature and the resources for the response message could be defined. Alternatively, the physical resource of the response RACH message could be allocated based on UE specific information, such as UE identity. For example, system information could contain the method of calculation in order to map between UE identity and downlink resource of response RACH message. Then, the UE can know the position (frequency and/or time) of response RACH message after sending RACH message according to its calculation.

Figure 24:
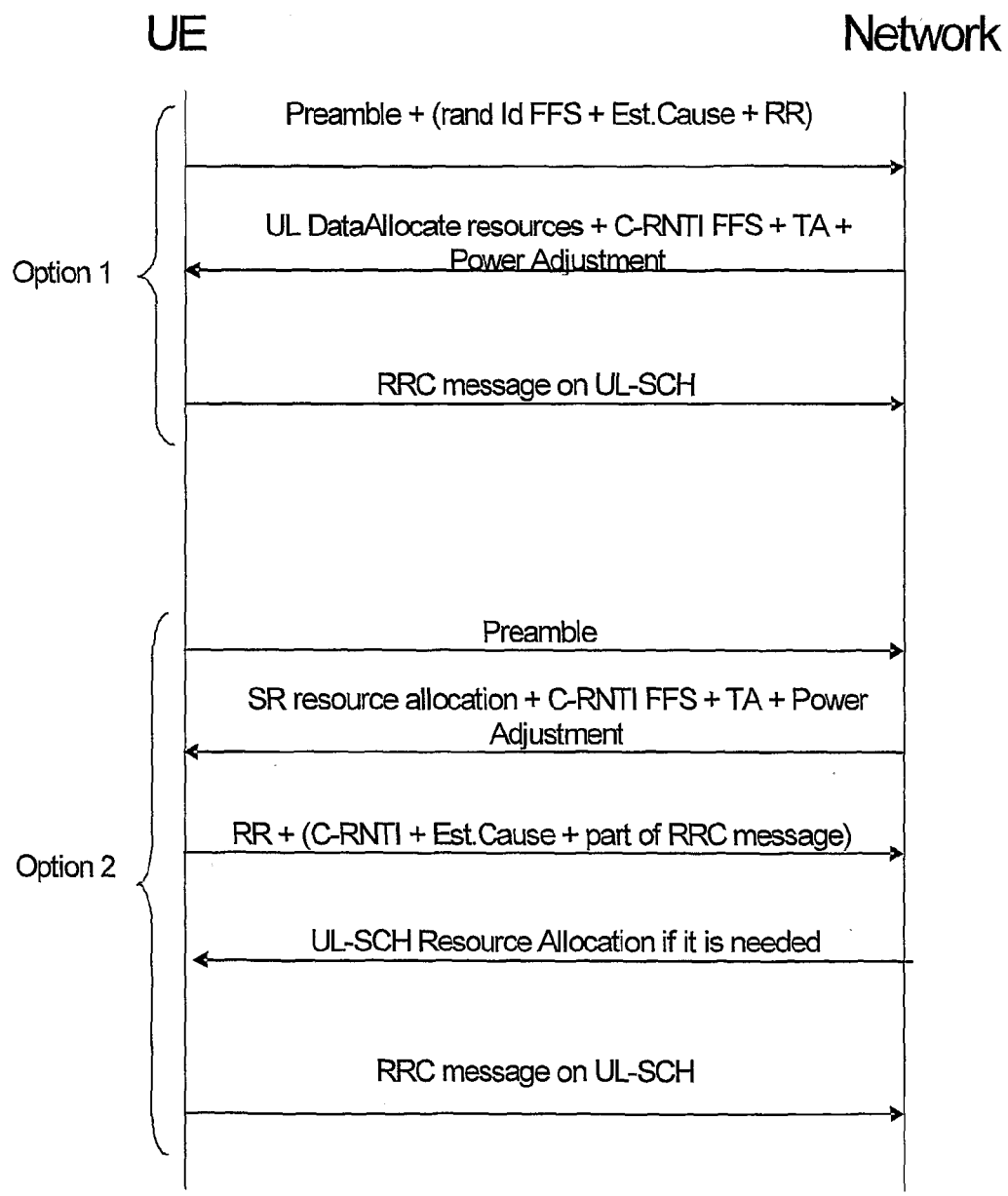
FIG. 24 shows examples of the options for unsynchronized RACH procedures.
Figure 25:
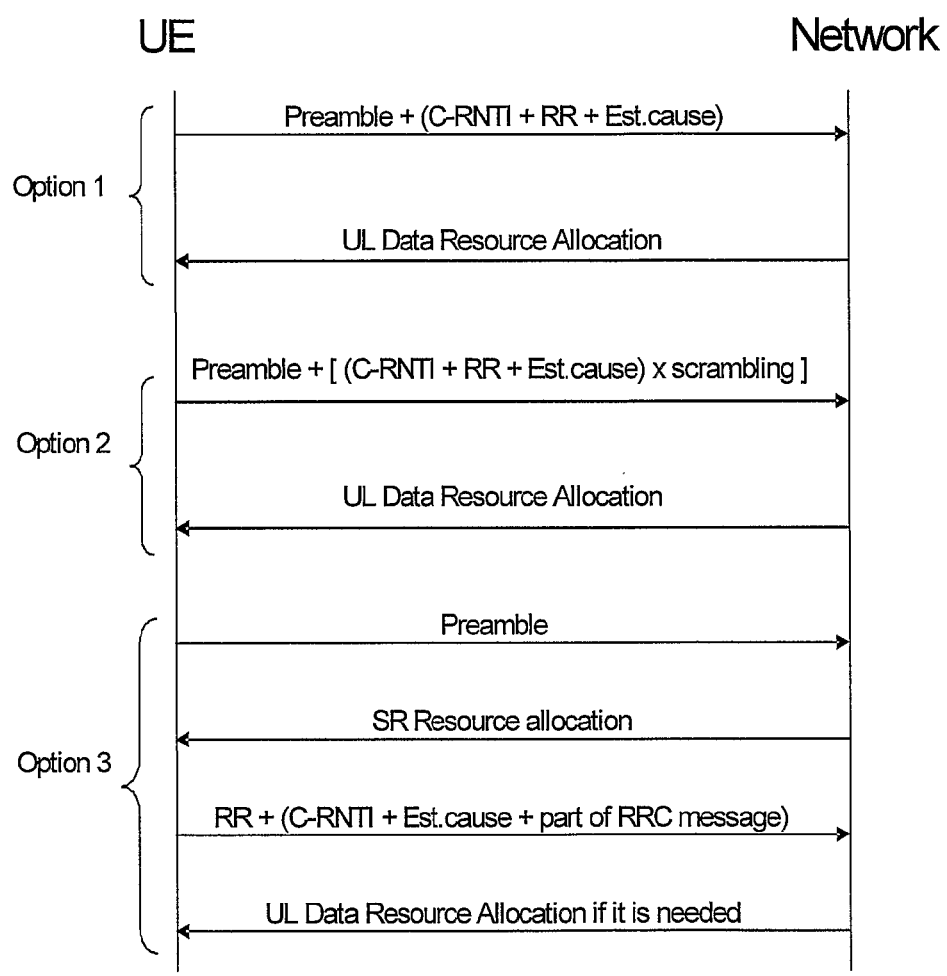
FIG. 25 shows examples of the options for the synchronized RACH procedure, whereby three random access procedures are possible.
Figure 26:
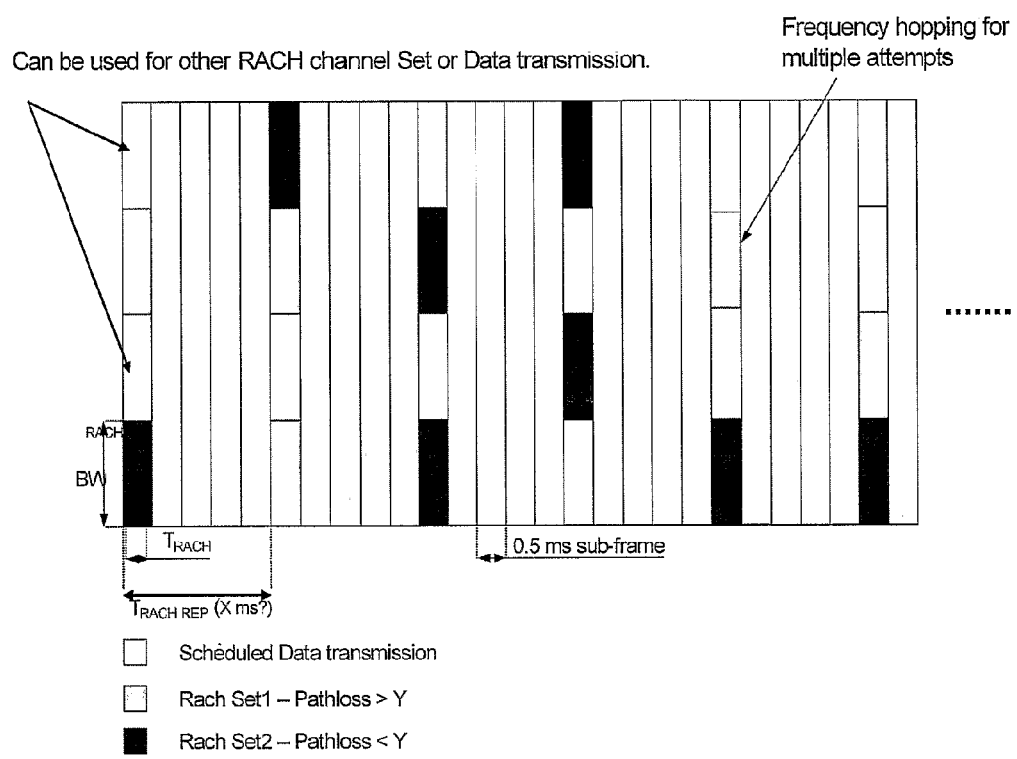
FIG. 26 shows an example of RACH resource allocation according to the present invention.

FIGS. 24 through 26 show examples of signaling between the UE and the network for random access attempts, as well as RACH resource allocation for different implementations (i.e., use cases) according to the present invention.

Hereafter, Random Access Use Cases will be considered. It has been identified that random access procedure can be used for initial access to obtain L1 synchronization, for resource request when no UL resources are available and for control of UE mobility. These use cases can be classified into 3 different states:

(1) Idle mode UE/Detached mode UE/UE Mobility;
(2) Synchronized active UE without resources; and
(3) Non-synchronized active UE without resources (under FFS in RAN2).

The different possible procedures for each state are discussed in following.

a) Idle mode UE/Detached UE/UE Mobility; and
b) Considerations on the Bandwidth and the preamble length.

In these states, the main purpose should be to detect the UE, calculate the necessary timing alignment, and allocate uplink resources for the UE. According to our understanding the minimum BW for non-synchronized random access transmission should be 1.25 MHz. Indeed as shown in figure below the autocorrelation function presents a lobe for localized mapping scheme which offers better timing estimation than equidistant mapping scheme. The lobe width is approximately equal to 1/BW which should be a fraction of the cyclic prefix for timing uncertainty. For a BW of 1.25 MHz, the autocorrelation lobe is in the order of 0.8 µs which is sufficiently smaller than the typical CP duration (approximately 5µ). For BW less than 1.25 MHz, for instance BW of 375 KHz the uncertainty increases threefold and thus if such a BW would be used it is necessary to evaluate the impact of the timing uncertainty on the uplink transmission, although this can be advantageous in order to take advantage of the frequency selectivity of the channel.

It should be possible to have a reasonable performance for the detection in the case of 3 symbols in the case of the TU channel at 3 km/h. However, it is important to agree on the assumptions for the simulations.

In order to decide on the above points, it is necessary to make assumptions on:

a) The required precision for the timing; and
b) The maximum achievable SNR in the UL at the Node B, i.e. the necessary assumptions on the link budget.

Based on these assumptions, it should be possible to estimate the number of symbols necessary for the transmission of the preamble for the different bandwidths, and different speed and channels.

FIG. 24 shows examples of the options for unsynchronized RACH procedures.

In option 1 on the contention channel, the preamble and message payload including X bits message (TBD) containing some information on UL resources needed, priority, establishment cause (i.e., the purpose of RACH, RACH cause, reason for random access, etc.), and possibly random Id to assist in resolution of contention, are combined together. After the X bits have been decoded by the network, it responds with the necessary timing advance information to be used on the UL SCH and requested scheduling grant, and possibly, other required information. In a case when no resource request can be sent (due to some coverage issue), the necessary amount of UL resources to allocate can be either constant regardless of the random access cause, or based on the preamble linked to the random access cause. When getting uplink allocation, the UE transmits the L3 messages, MAC data or control PDU, on the scheduled resources.

In option 2, only the preamble is transmitted by the UE on the contention based channel. Upon detection by the network, signalling resources are allocated to the UE. Then, on the scheduled resources, the UE sends the scheduling grant. The network adjusts the resource allocation depending on what the UE needs for message payload part transmission. This procedure avoids that the network allocates inadequate resources for the transmission of the RRC message and to treat priorities correctly.

The choice between the possible options (i.e., option 1 or option 2) is a trade off between the time that is used for the additional transmission of information to request UL SCH resources and the resources wasted and the interference created by transmitting the resource request together with the preamble which might not be detected or which might be in collision. With all those assumptions, it may be difficult to show a clear benefit for one or the other procedure, as long as the size of the data does not become too large. In order to decide on the scheme, the necessary preamble size, and the required resources per carried data bit in the case it is sent together with the preamble need to be known.

Additional factors when choosing between option 1 or option 2 should be considered in order to clarify the resources required for the preamble and the overhead due to additional data bits.

Regarding Synchronized Active UE without resources, when the UE sends this type of resource request it has already established synchronization, and thus the timing estimation that can be done from this transmission is not so important. In this case, the synchronized random access procedure can be considered for resource request with smaller bandwidth than for non-synchronized access. This bandwidth could be equal to the bandwidth of the uplink resource unit and should be considered based on the number of bits that are required to be transmitted. There is the need to transmit C-RNTI for UE identification.

FIG. 25 shows examples of the options for the synchronized RACH procedure, whereby three random access procedures are possible.

In option 1, a preamble and a C-RNTI and RR are transmitted on a specific resource reserved for the RACH procedure, where the C-RNTI and the RR are protected by a channel coding. A UE that has no occasion of transmitting the RR otherwise chooses a preamble and transmits the preamble and the resource request on the specific resource. If two terminals perform random access procedure in the same time with the same time/frequency resources the C-RNTI and the RR might not be able to be decoded correctly.

In option 2, the C-RNTI and the RR are protected by a channel coding, and (optional) additional redundancy. A UE that has no occasion of transmitting the RR otherwise chooses a preamble and transmits the preamble and the resource request on the specific resource, where the C-RNTI and the RR are coded specifically, and in addition to this scrambled by a scrambling code which is specific to the preamble used. Depending on the level of redundancy introduced for the coding the Node B might be able to decode the C-RNTI and the RR even in the case of a collision.

In option 3, the UE chooses one of the available preambles and transmits it on the reserved resource. In case of a collision the Node B is able to choose one of the preambles and allocates resources to the UE that transmitted this preamble. In the case that two UEs have transmitted the same preamble there is a risk that both UEs will consider the Resource allocation for themselves.

For Non-Synchronized Active UE without resources, whether this possibility is necessary depends on the decisions on the sleeping mode in active state and the general handling of synchronization. The possible procedure can be the same as idle mode UE, with exception that the C-RNTI is already available.

In the Random Access Procedure, for inter-cell interference mitigation, one proposal would be to define in each cell sets of RACH channels which would use different sub-bands. For random access the UE should then choose one of the available sets based on the path loss that the UE measures, such that UEs with big path loss, i.e. which are far from the base station would use a specific set, such that the major UL interference is localized in this set. Inside one set the choice of the available resources could be made in a random manner.

FIG. 26 shows an example of RACH resource allocation according to the present invention.

During the random access procedure, the UE transmits RACH burst and the network measures the received signal from the terminal. Then it sends a timing advance (TA) command, which commands the terminal to adjust its uplink transmission timing accordingly. A second RACH transmission may be done to verify the adjusted time offset and possibly help for collision resolution. Once synchronisation is obtained, the message part is sent on the uplink shared resources which are scheduled by Node B.

Whether there is a need for resource request or to maintain time synchronisation in the uplink, RACH or control signalling resources can be used.

Once the signature is sent, the UE should wait for the reception of a response message (including ACK/NACK/Timing Adjustment). If uplink system band and downlink system band are the same a one to one mapping for the resources for the RACH signature and the resources for the response message could be defined. Alternatively the physical resource of the response RACH message could be allocated based on UE specific Info such as UE identity. For example, system information could contain the method of calculation in order to map between UE identity and downlink resource of response RACH message. Then UE can know the position (frequency/time) of response RACH message after sending RACH message according to its calculation.

The concepts and features of the present invention are not limited to wireless systems, but has applicability to any communication system having an access protocol for communication resources.

The present disclosure provides a method of coordinating resources for repetition of random access bursts performed by a mobile terminal, the method comprising: determining groups of access slots based on parameters from a network, wherein each access slot is defined by any combination of frequency, time and code, and the access slots are organized according to a frequency pattern; transmitting an access burst on an access slot from a chosen group of access slots; and re-transmitting the access burst on the next access slot from the chosen group of access slots.

The re-transmitting may be performed when a negative acknowledgement is received or when no response is received from the network. The frequency pattern may be static or dynamic. The frequency pattern may be based on a RACH Allocation Index Offset. The determining may be based on dedicated signaling or broadcast signaling or multicast signaling. The groups of access slots may comprise a first group of access slots for path loss greater than or equal to a threshold value. The method may further comprise a second group of access slots for path loss less than the threshold value. At least one access slot of the first group may be in a single sub-frame or at least one access slot of the second group is in a single sub-frame. An access slot of the first group and an access slot of the second group may be in the same sub-frame. One or more subsequent sub-frames may contain scheduled data transmission information.

The transmitting step may be performed for an unsynchronized RACH procedure comprising: transmitting to a network, on a contention based channel, a preamble and a message payload containing some information on uplink resources needed, priority, reason for random access, and possibly random Id to assist in resolution of contention; receiving, from the network, scheduled resources containing necessary timing advance information to be used on the uplink and requested scheduling grant, and other required information; and transmitting L3 messages, MAC data or control PDUs on the scheduled resources.

The method wherein the transmitting step may be performed for an unsynchronized RACH procedure comprising: transmitting to a network, on a contention based channel, only a preamble; receiving signalling resources allocated from the network; sending a scheduling grant on the signaling resources to allow the network to adjust resource allocation depending on what the mobile terminal needs for message payload part transmission; receiving, from the network, scheduled resources containing necessary timing advance information to be used on the uplink and requested scheduling grant, and other required information; and transmitting L3 messages, MAC data or control PDUs on the scheduled resources.

The method wherein the transmitting step may be performed for a synchronized RACH procedure comprising: transmitting to a network, a preamble together with a C-RNTI, a RR, and a reason for random access, on a specific resource reserved for a RACH procedure, where the C-RNTI and the RR are protected by channel coding; and receiving uplink data resource allocation from the network.

The C-RNTI and the RR may be protected by channel coding, as well as additional redundancy. The transmitting step may be performed for a synchronized RACH procedure comprising: transmitting to a network, a preamble on a specific resource reserved for a RACH procedure; receiving specific resource allocation from the network; transmitting a RR, a C-RNTI, a reason for random access, and part of a RRC message on the allocated specific resource; and receiving uplink data resource allocation from the network.

Also, the present disclosure provides a method of coordinating resources for repetition of random access bursts performed by a network, the method comprising: configuring parameters that allow a terminal to determine groups of access slots, wherein each access slot is defined by any combination of frequency, time and code, and the access slots are organized according to a frequency pattern; using the configured parameters to determine when resources should not be allocated for other uplink transmissions; and transmitting the configured parameters to the terminal.

The method may further comprise: receiving an access burst transmitted by a terminal on any access slot. The method may further comprise: receiving the access burst re-transmitted by the terminal on the next access slot belonging to the same group as the previous access slot. The parameters may comprise a RACH Allocation Index Offset.

Certain relative portions of the 3GPP specification, such as 3GPP TS 22.011, 25.321, 25.331, 25.913, etc. (and their ongoing enhancements and other related sections) are part of the embodiments of the present invention and constitute part of the present disclosure by being incorporated herein by reference.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:
1. A method of coordinating resources for repetition of random access bursts performed by a mobile terminal, the method comprising:
   determining, by the mobile terminal, groups of access slots based on parameters from a network, wherein the access slots are organized according to a frequency pattern and each access slot is defined by at least frequency, time or code;
   transmitting, by the mobile terminal, an access burst on an access slot of a chosen group of the groups of access slots; and
   re-transmitting, by the mobile terminal, the access burst on a next access slot of the chosen group,
   wherein the groups of access slots comprise:
   a first group of access slots corresponding to a first path loss greater than or equal to a first threshold value;
   a second group of access slots corresponding to a second path loss less than the first threshold value and greater than a second threshold value; and
   a third group of access slots corresponding to a third path loss less than the second threshold value; and wherein the first path loss, the second path loss and the third path loss represent a signal attenuation between the mobile terminal and the network.

2. The method of claim 1, wherein the re-transmitting is performed when a negative acknowledgement is received or when no response is received from the network.

3. The method of claim 1, wherein the frequency pattern is static or dynamic.

4. The method of claim 1, wherein the frequency pattern is based on a Random Access Channel (RACH) Allocation Index Offset.

5. The method of claim 1, wherein the determining is based on dedicated signaling, broadcast signaling or multicast signaling.

6. The method of claim 1, wherein at least one access slot of the first group or the second group is in a single sub-frame.

7. The method of claim 1, wherein an access slot of the first group and an access slot of the second group are in a same sub-frame.

8. The method of claim 6, wherein one or more sub-frames subsequent to the single sub-frame contain scheduled data transmission information.

9. The method of claim 1, wherein transmitting the access burst comprises:
   transmitting to the network, on a contention based channel, a preamble and a message payload containing information on uplink resources needed, priority, a reason for random access, and a random identifier (ID) to assist in resolution of contention;
   receiving, from the network, scheduled resources comprising necessary timing advance information to be used on an uplink transmission, a requested scheduling grant, and other required information; and
   transmitting third layer (L3) messages, Medium Access Control (MAC) data or control protocol data units (PDUs) using the scheduled resources.

10. The method of claim 1, wherein transmitting the access burst comprises:
    transmitting to the network, on a contention based channel, only a preamble;
    receiving signalling resources allocated from the network;
    sending a scheduling grant on the signaling resources to allow the network to adjust resource allocation depending on needs of the mobile terminal for message payload part transmission;
    receiving, from the network, scheduled resources comprising necessary timing advance information to be used on an uplink transmission, a requested scheduling grant, and other required information; and
    transmitting third layer (L3) messages, Medium Access Control (MAC) data or control protocol data units (PDUs) using the scheduled resources.

11. The method of claim 1, wherein transmitting the access burst comprises:
    transmitting to the network, on a specific resource reserved for a Random Access Channel (RACH) procedure, a preamble together with a Cell-Radio Network Temporary Identity (C-RNTI), a resource request (RR), and a reason for random access, wherein the C-RNTI and the RR are protected by channel coding; and
    receiving an uplink data resource allocation from the network.

12. The method of claim 11, wherein the C-RNTI and the RR are further protected by additional redundancy.

13. The method of claim 1, wherein transmitting the access burst comprises:
    transmitting, to the network, a preamble on a specific resource reserved for a Random Access Channel (RACH) procedure;
    receiving a specific resource allocation from the network;
    transmitting a resource request (RR), a Cell-Radio Network Temporary Identity (C-RNTI), a reason for random access, and part of a Radio Resource Control (RRC) message using the specific resource allocation; and
    receiving an uplink data resource allocation from the network.

14. A method of coordinating resources for repetition of random access bursts performed by a network, the method comprising:
    configuring, by the network, parameters for a terminal to determine groups of access slots, wherein the access slots are organized according to a frequency pattern and each access slot is defined by at least frequency, time or code;
    using, by the network, the configured parameters to determine when resources should not be allocated for other uplink transmissions; and
    transmitting, by the network, the configured parameters to the terminal,
    wherein the groups of access slots comprise:
    a first group of access slots corresponding to a first path loss greater than or equal to a first threshold value;
    a second group of access slots corresponding to a second path loss less than the first threshold value and greater than a second threshold value; and
    a third group of access slots corresponding to a third path loss less than the second threshold value; and
    wherein the first path loss, the second path loss and the third path loss represent a signal attenuation between the terminal and the network.

15. The method of claim 14, further comprising:
    receiving a transmission of an access burst from the terminal on a first access slot.

16. The method of claim 15, further comprising:
    receiving a re-transmission of the access burst by the terminal on a next access slot belonging to a same group as the first access slot.

17. The method of claim 14, wherein the parameters comprise a Random Access Channel (RACH) Allocation Index Offset.

* * * * *